US012717185B2

(12) United States Patent
Fujii et al.

(10) Patent No.: US 12,717,185 B2
(45) Date of Patent: Aug. 25, 2026

(54) SURFACE LIGHT SOURCE DEVICE, DISPLAY DEVICE AND LIGHT FLUX CONTROLLING MEMBER

(71) Applicant: Enplas Corporation, Saitama (JP)

(72) Inventors: Yuki Fujii, Saitama (JP); Hiroaki Kobayashi, Saitama (JP)

(73) Assignee: Enplas Corporation, Saitama (JP)

(*) Notice: Subject to any disclaimer, the term of this patent is extended or adjusted under 35 U.S.C. 154(b) by 0 days.

(21) Appl. No.: 19/038,940

(22) Filed: Jan. 28, 2025

(65) Prior Publication Data

US 2026/0219533 A1 Jul. 30, 2026

(51) Int. Cl.
*G02F 1/13357* (2006.01)

(52) U.S. Cl.
CPC .. *G02F 1/133606* (2013.01); *G02F 1/133603* (2013.01)

(58) Field of Classification Search
CPC ......... G02F 1/133606; G02F 1/133603; F21V 5/04; F21V 7/0091; F21Y 2105/16; F21Y 2115/10
See application file for complete search history.

(56) References Cited

U.S. PATENT DOCUMENTS

2010/0201910 A1* 8/2010 Iiyama ................. H10H 20/855 362/327
2014/0063801 A1* 3/2014 Seki ................... G02B 19/0014 362/335
2015/0077976 A1* 3/2015 Jiang .................. G02B 19/0028 362/326
2015/0109762 A1* 4/2015 Lee ......................... G09F 13/14 362/329
2020/0348566 A1* 11/2020 Mochida ........... G02F 1/133606

FOREIGN PATENT DOCUMENTS

WO WO-2013055020 A1 * 4/2013 ........... H10H 20/855

* cited by examiner

*Primary Examiner* — Erin Kryukova
(74) *Attorney, Agent, or Firm* — Shih IP Law Group, PLLC

(57) ABSTRACT

A surface light source device of the present invention includes: a plurality of light-emitting devices disposed on an XY plane of an XYZ coordinate that defines an X direction, a Y direction and a Z direction orthogonal to each other; and a light diffusion plate disposed at a distance from the XY plane in the Z direction. Each of the plurality of light-emitting devices includes a light-emitting element and a light flux controlling member configured to control light from the light-emitting element, and Condition 1, Condition 2, and Condition 3-1 or 3-2 are satisfied.

5 Claims, 21 Drawing Sheets

500
520
522 521 522
531 432
530

500
522
521
520
522
Y
Z
X

500
F
440
410
Z
X
Y
F 500
530
531 432
Z
Y
X 500
440

500
440
410

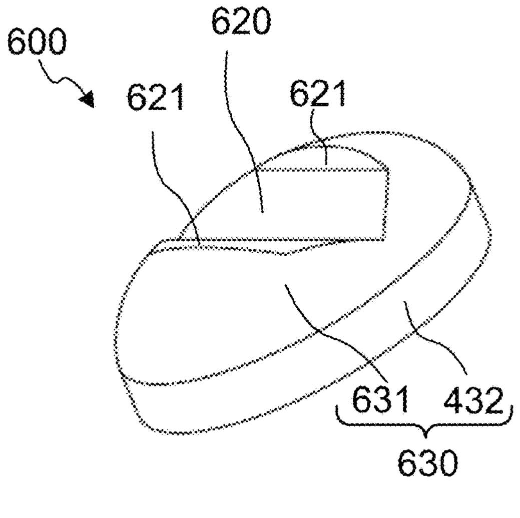
FIG. 8A
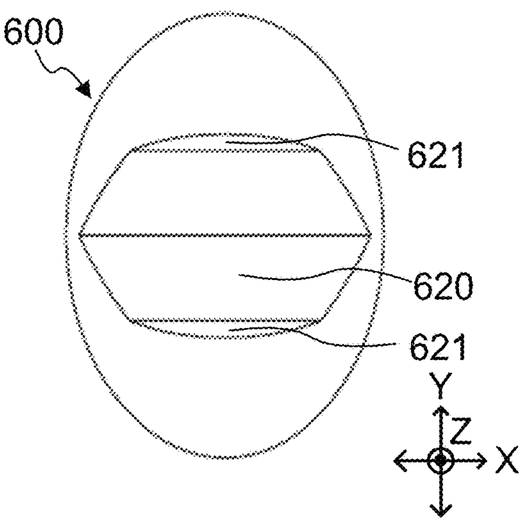
FIG. 8B
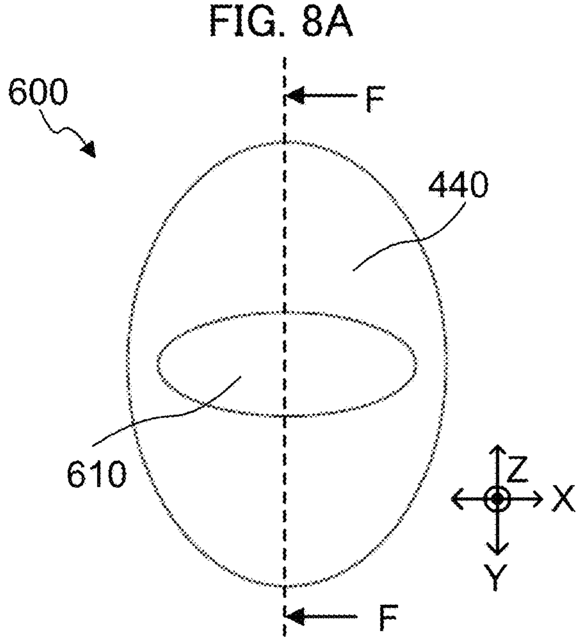
FIG. 8C
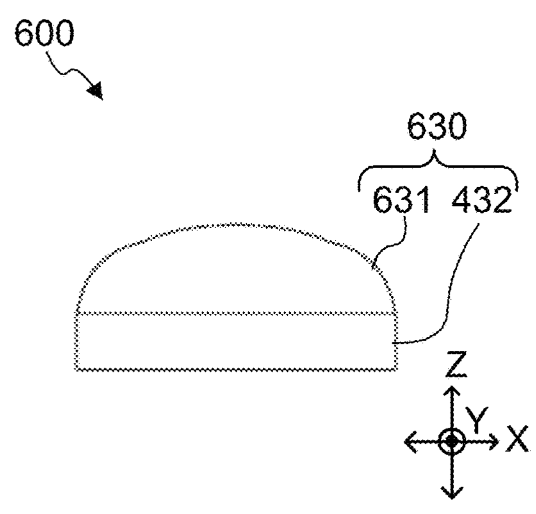
FIG. 8D
600
621
620
621
440
FIG. 8E
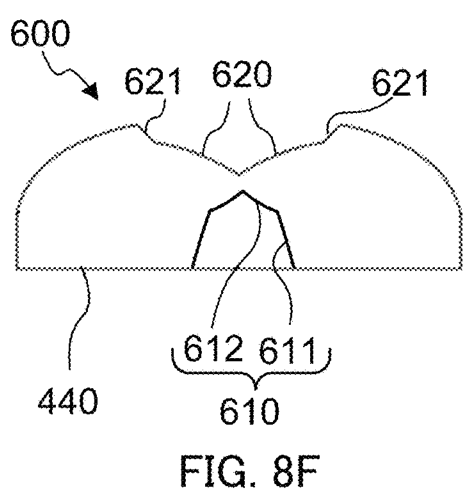
FIG. 8F

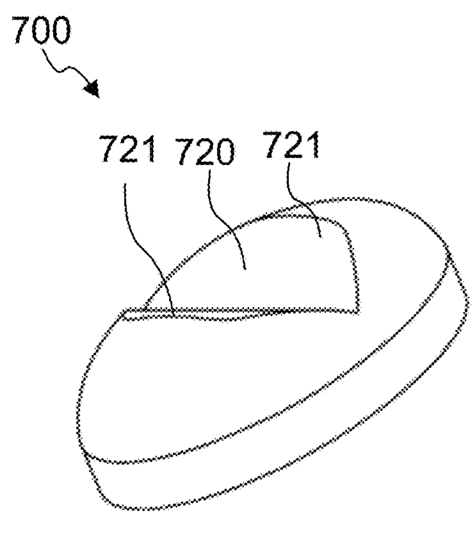
FIG. 9A
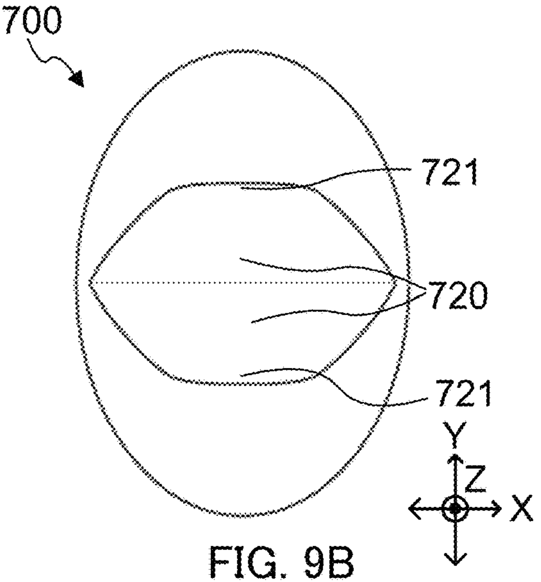
FIG. 9B
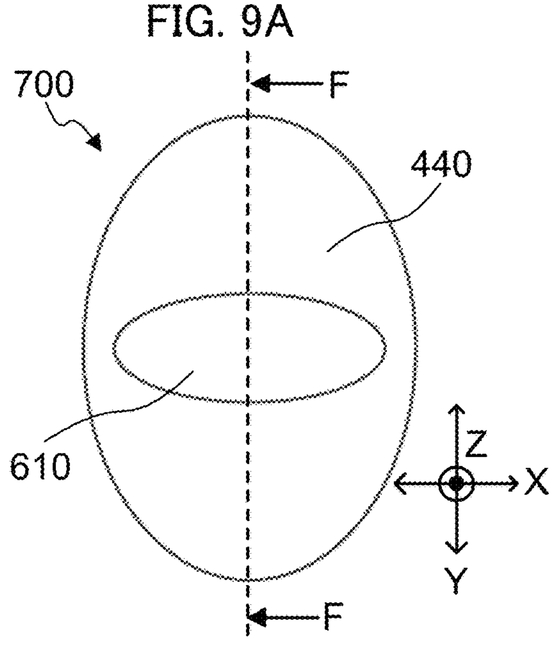
FIG. 9C
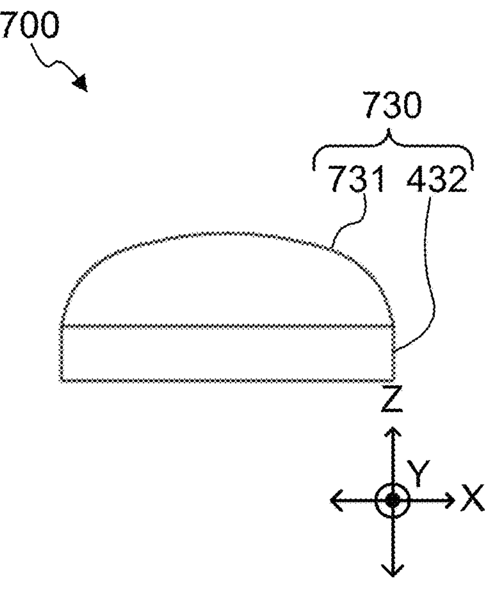
FIG. 9D
700
721
720
721
440
FIG. 9E
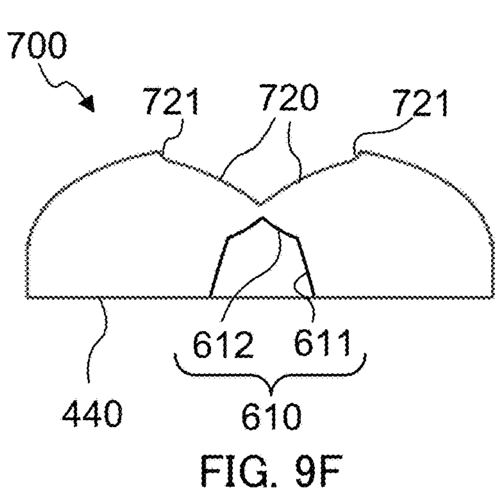
FIG. 9F 800
820

800
820
Y
Z
X

800
F
440
410
F
Z
X
Y 800
830
831
832
Z
Y
X 800
820
440

800
440
410

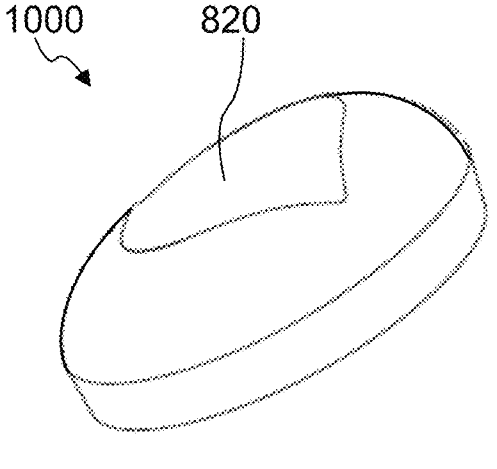
FIG. 12A
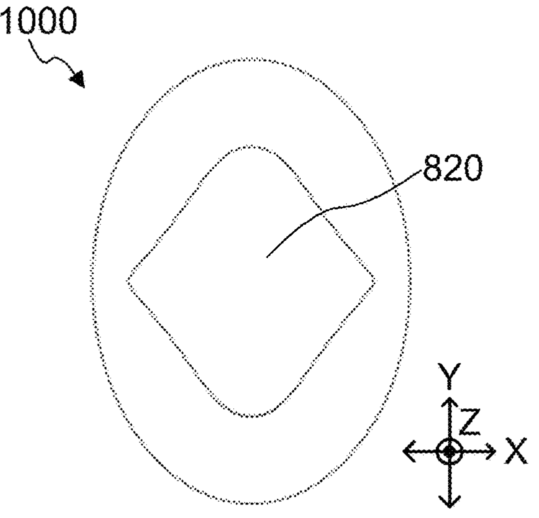
FIG. 12B
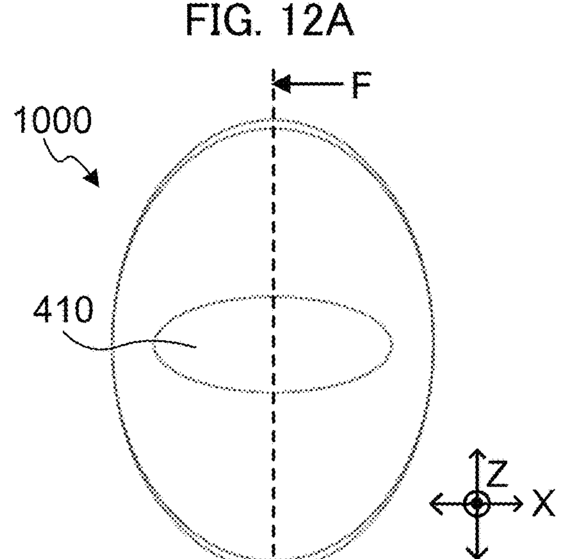
FIG. 12C
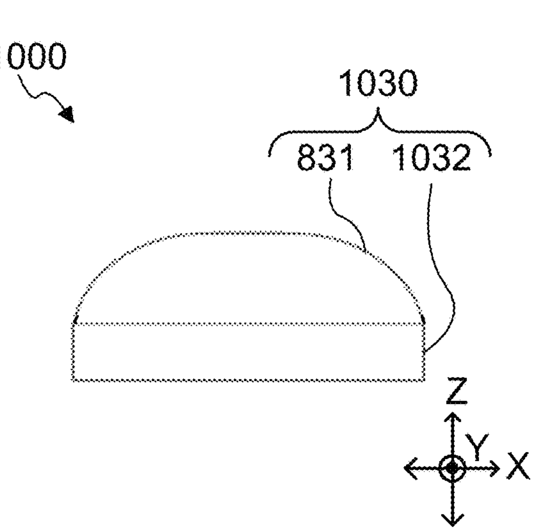
FIG. 12D
1000
820
1030
831
1032
Z
X
Y
FIG. 12E
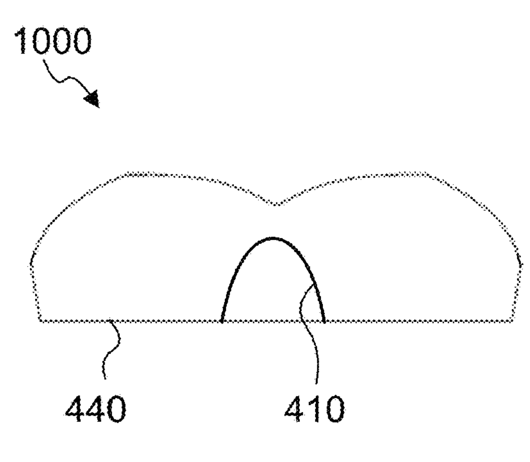
FIG. 12F 1300
1320
1322 1321 1322

1300
1322
1321
1320
1322

F
1300
610
F 1300
1330
1331 432

1300

1300
612 611
610

SURFACE LIGHT SOURCE DEVICE, DISPLAY DEVICE AND LIGHT FLUX CONTROLLING MEMBER

TECHNICAL FIELD

The present invention relates to a surface light source device, a display device and a light flux controlling member.

BACKGROUND ART

Transmissive image display devices such as liquid crystal display devices are known. Transmissive image display devices display images when light from a surface light source device hits a display member. For example, PTL 1 discloses such a surface light source device.

CITATION LIST

Patent Literature

PTL 1
Publication of Unexamined Application of US Patent Specification No. 2015-0109762 (Specification)

SUMMARY OF INVENTION

Technical Problem

FIG. 1 is a sectional view of the above-mentioned surface light source device 10. As illustrated in FIG. 1, surface light source device 10 includes a plurality of light-emitting devices 20, and light diffusion plate 11 that diffuses light from the plurality of light-emitting devices 20. In surface light source device 10, light diffusion plate 11 is disposed at a distance in the Z direction when the plane on which the plurality of light-emitting devices 20 is disposed is defined as the XY plane, as illustrated in FIG. 1. In surface light source device 10, light from the plurality of light-emitting devices 20 is diffused by light diffusion plate 11 and becomes planar light.

In this case, for example, if light diffusion plate 11 is deflected, the distance between light diffusion plate 11 and the XY plane on which light-emitting device 20 is disposed may change. More specifically, if the distance OD in the Z direction between light arrival plane 11*a* located on light-emitting device 20 side of light diffusion plate 11 and the XY plane on which light-emitting device 20 is disposed changes, non-uniformity may occur in the light emitted from surface light source device 10, and the image quality of a display device such as a liquid crystal display device may be degraded.

An object of the present invention is to provide a surface light source device, a display device, and a light flux controlling member used for the surface light source device that can suppress degradation in image quality even if the distance between the light arrival plane of the light diffusion plate and the plane on which the light-emitting device is disposed changes.

Solution to Problem

The present invention relates to the following surface light source device, display device and light flux controlling member.

[1] A surface light source device including: a plurality of light-emitting devices disposed on an XY plane of an XYZ coordinate that defines an X direction, a Y direction and a Z direction orthogonal to each other; and a light diffusion plate disposed at a distance from the XY plane in the Z direction. Each of the plurality of light-emitting devices includes a light-emitting element and a light flux controlling member configured to control light from the light-emitting element. The light flux controlling member includes an incidence surface from which light from the light-emitting element enters, a total reflection surface configured to reflect a part of light entered from the incidence surface, and an emission surface disposed at a periphery of the total reflection surface. One or more of the plurality of light-emitting devices are arranged in a line in the X direction and one or more of the plurality of light-emitting devices are arranged in a line in the Y direction, and Py>Px holds, where Px represents a center-to-center distance of adjacent light-emitting devices among the one or more of the plurality of light-emitting devices arranged in the X direction, and Py represents a center-to-center distance of adjacent light-emitting devices among the one or more of the plurality of light-emitting devices arranged in the Y direction. When a line extending along an optical axis OA of a light-emitting element of a given light-emitting device among the plurality of light-emitting devices is set as a reference line L1, an intersection of the reference line L1 and a light arrival plane located on the light-emitting device side of the light diffusion plate is set as a first reference point P1, and an angle of light emitted from the light-emitting element along the reference line L1 is set as 0°, a position where a light beam corresponding to a luminous intensity peak top reaches on the light arrival plane is within a range from Py/3 to Py from the first reference point P1 for light emitted at 0° to 90° from a light-emitting element corresponding to the given light-emitting device in a graph illustrating light distribution characteristics on a YZ cross section related to an emission light luminous intensity from the light-emitting device. Light that is emitted from the given light-emitting element, reflected by the total reflection surface, and reached the emission surface is emitted from the emission surface at an angle larger than 90° with respect to the reference line L1. When an intersection of the reference line L1 and the XY plane is set as a second reference point P2, and a rectangular with two sides of a length Px and a length Py on the XY plane with the second reference point P2 as a vertex is divided by a diagonal line of the rectangular passing through the second reference point P2 into a triangular region A with the second reference point P2 located at an endpoint of the side with the length Px and a triangular region B with the second reference point P2 located at an endpoint of the side with the length Py, a greater amount of light reaches the triangular region B than the triangular region A when an arrival amount of light reflected by the total reflection surface is compared between the triangular region A and the triangular region B. In a graph representing a luminance distribution of luminance variation on a straight line extending along the Y direction and passing through the second reference point P2 for light reflected by the total reflection surface and reached the XY plane, (A) a position in the Y direction of a luminance peak top is located at a position farther from the second reference point than a distance D between an outer edge of the light flux controlling member and a center of the light flux controlling member along the Y direction, or (B) when a line segment corresponding to a half width of a luminance peak is divided into a first division segment W1 nearer to the reference line L1 than the peak top in the Y direction and a second division segment W2 farther from the reference line L1 than the peak top in the Y direction, a length of the second division segment W2 is 1.5 times or greater than a length of the first division segment W1.

[2] The surface light source device according to [1], in which a shoulder peak is present in the graph of the luminance distribution.

[3] A display device including the surface light source device according to [1] or [2].

[4] A light flux controlling member used for the surface light source device according to [1] or [2].

Advantageous Effects of Invention

According to the present invention, it is possible to provide a surface light source device, a display device, and a light flux controlling member used for the surface light source device that can suppress degradation in image quality even if the distance between the light arrival plane of the light diffusion plate and the plane on which the light-emitting device is disposed changes.

BRIEF DESCRIPTION OF DRAWINGS

FIGS. 8A to 8F are diagrams illustrating a configuration of a light flux controlling member according to Embodiment 3;

FIGS. 9A to 9F are diagrams illustrating a configuration of a light flux controlling member according to Embodiment 4;

FIGS. 12A to 12F are diagrams illustrating a configuration of a light flux controlling member according to Embodiment 7;

DESCRIPTION OF EMBODIMENTS

Embodiments of the present invention are elaborated below with reference to the accompanying drawings. In the following description, surface light source devices suitable for a backlight of a liquid crystal display device and the like are described as a typical example of a surface light source device according to the present invention. These surface light source devices can be used as display device 100' when combined with display member 102 (e.g., liquid crystal panel) configured to be irradiated with light from the surface light source device (see FIG. 2B).

Embodiments

Surface Light Source Device and Light-Emitting Device

Figure 1:
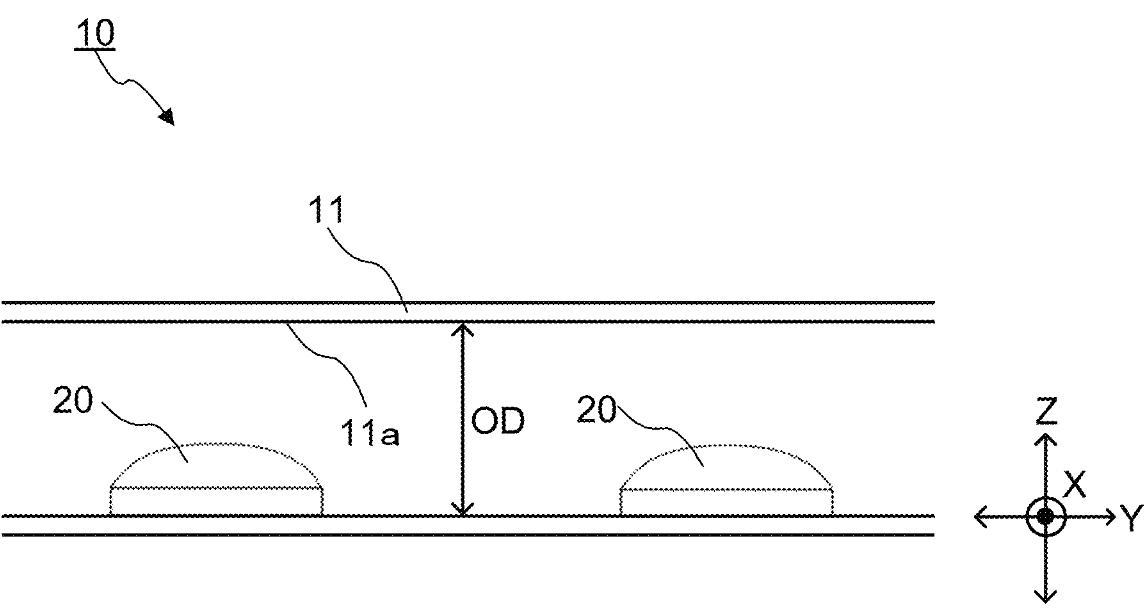
FIG. 1 is a diagram illustrating a cross section of a surface light source device.
Figure 2A:
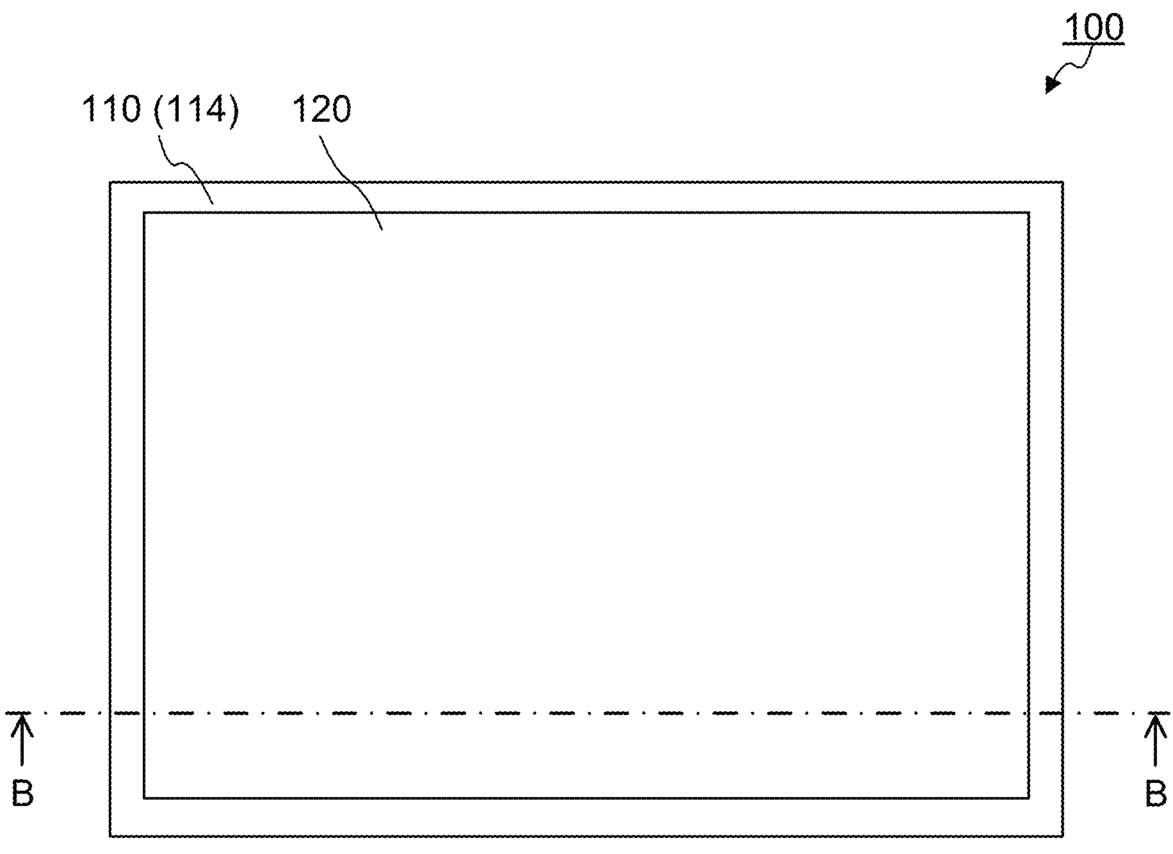
FIGS. 2A and 2B are diagrams illustrating a configuration of a surface light source device according to the embodiment.
Figure 2B:
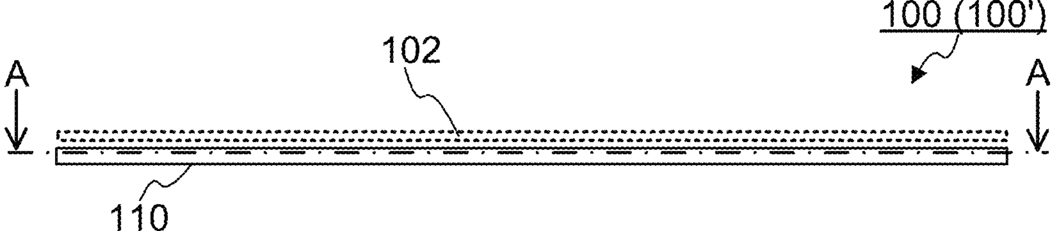
Figure 3A:
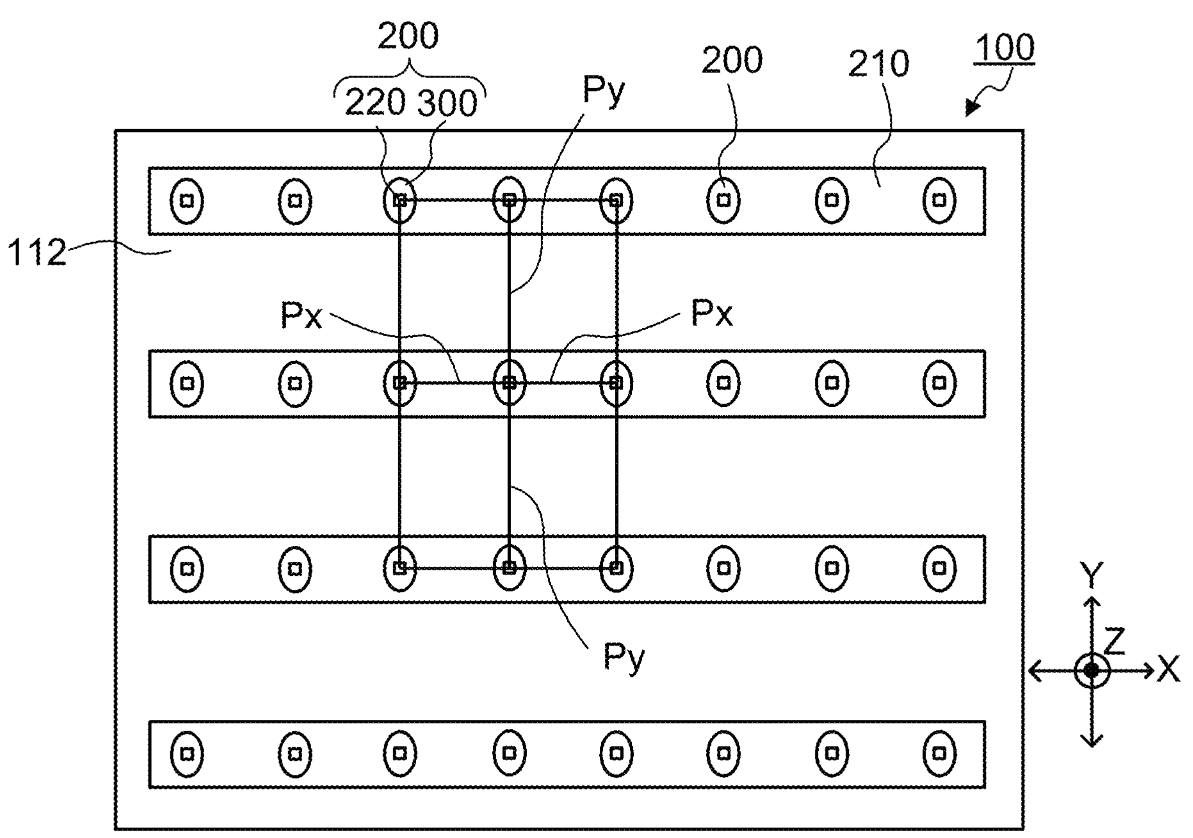
FIGS. 3A and 3B are diagrams illustrating a cross section of a surface light source device.
Figure 3B:
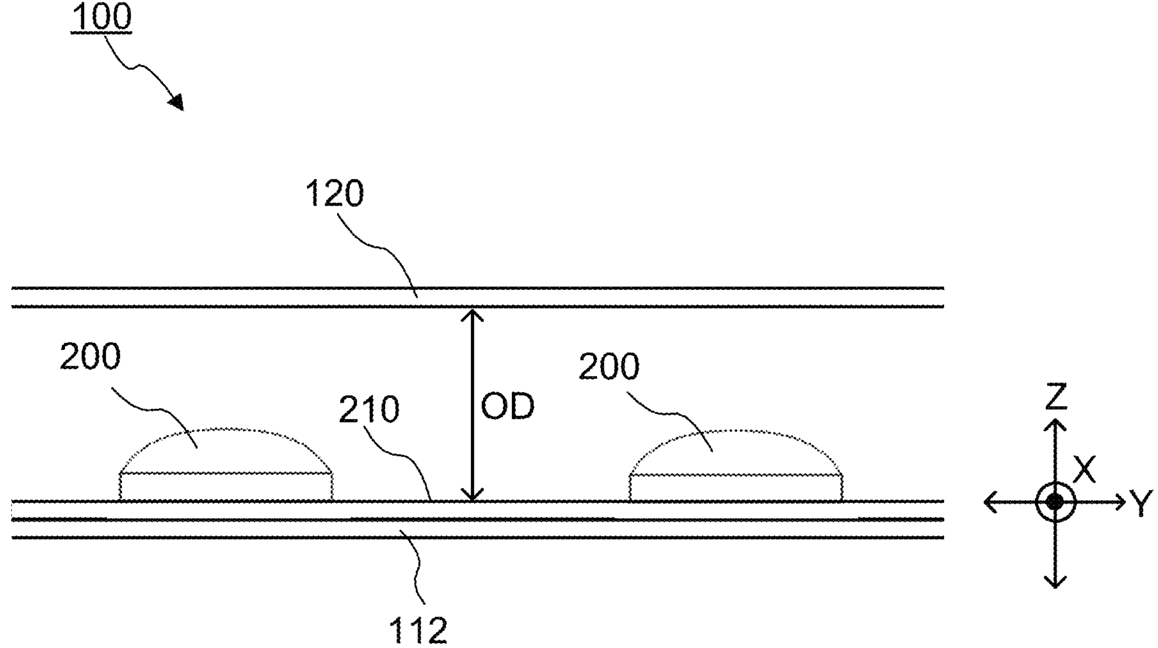

FIGS. 2A and 2B are diagrams illustrating a configuration of surface light source device 100 according to the embodiment of the present invention. FIG. 2A is a plan view, and FIG. 2B is a front view. FIG. 3A is a schematic view illustrating a cross section taken along line A-A of FIG. 2B, and illustrates an overview of an arrangement of light-emitting device 200. FIG. 3B is a schematic view illustrating a cross section taken along line B-B of FIG. 2A.

As illustrated in FIGS. 2A to 3B, surface light source device 100 according to the present embodiment includes housing 110, the plurality of light-emitting devices 200 and light diffusion plate 120. As illustrated in FIG. 3A, the plurality of light-emitting devices 200 is disposed on bottom plate 112 of housing 110. The inner surface of bottom plate 112 functions as a diffusive reflection surface. In addition, top plate 114 of housing 110 is provided with an opening. Light diffusion plate 120 is disposed to close the opening, and functions as a light-emitting surface. The size of the light-emitting surface is not limited, but may be approximately 800 mm×approximately 1450 mm, for example.

As illustrated in FIG. 3A, in the present embodiment, light-emitting device 200 is fixed on substrate 210 fixed at a predetermined position on bottom plate 112 of housing 110. In the present embodiment, substrate 210 has a bar shape that is long in the X direction. The shape of the substrate is not limited to the bar shape. It may be a single substrate including a functionally unnecessary region where light-emitting device 200 is not disposed. The unnecessary substrate region is preferably eliminated from a view point of weight reduction. A single comb-tooth shaped substrate may be formed by connecting some of a plurality of bar shaped substrates disposed in parallel to the X axis with a substrate where no light-emitting device is disposed.

As illustrated in FIGS. 3A and 3B, surface light source device 100 of the present embodiment includes the plurality of light-emitting devices 200 disposed on the XY plane of the XYZ coordinate that defines the X direction, the Y direction and Z direction orthogonal to each other, and light diffusion plate 120 disposed at a distance in the Z direction from the XY plane.

As illustrated in FIG. 3A, in surface light source device 100, the plurality of light-emitting devices 200 is arranged in a line in the X direction and the Y direction, and Py>Px holds, where Px represents a center-to-center distance of adjacent light-emitting devices 200 among the plurality of light-emitting devices 200 arranged in the X direction, and Py represents a center-to-center distance of adjacent light-emitting devices among the plurality of light-emitting devices 200 arranged in the Y direction.

Figure 4A:
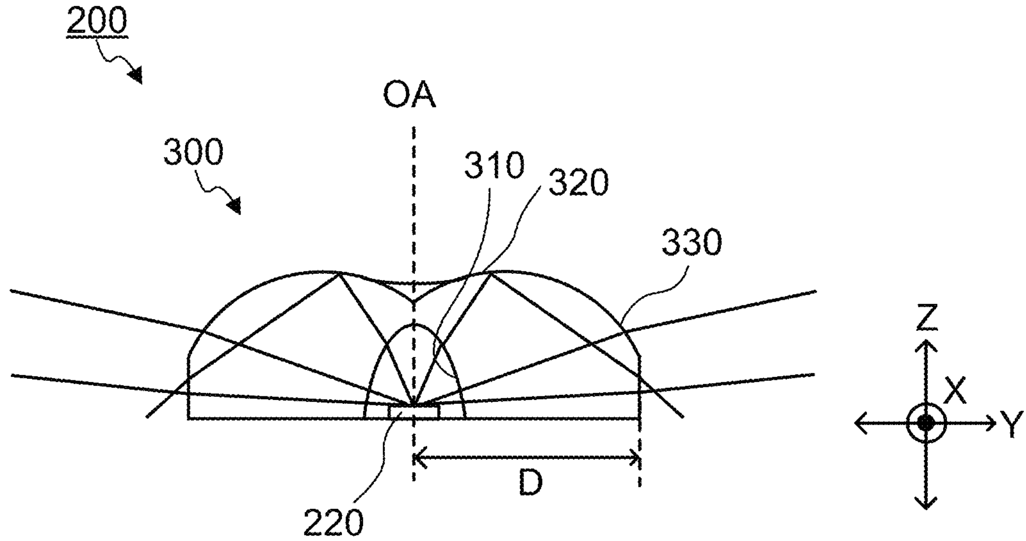
FIGS. 4A and 4B are diagrams for describing a light distribution in the surface light source device.

FIG. 4A is a diagram illustrating a cross section of light-emitting device 200 and light propagation. As illustrated in FIG. 4A, light-emitting device 200 includes light-emitting element 220 disposed on the XY plane, and light flux controlling member (lens) 300 for controlling light from light-emitting element 220.

Light-emitting element 220 and light flux controlling member 300 provided in light-emitting device 200 are described below.

Light-Emitting Element

Light-emitting element 220 is a light source of surface light source device 100, and is mounted on substrate 210. Light-emitting element 220 is a light-emitting diode (LED) such as a white light-emitting diode, for example. In addition, while the type of light-emitting element 220 is not limited, light-emitting element 220 (e.g., a COB light-emitting diode) that emits light from the top surface and side surface or the like is favorably used in light-emitting device 200 according to the present embodiment. Preferably, the size of light-emitting element 220 is, but not limited to, 0.1 mm to 1.6 mm, more preferably 0.2 mm to 0.7 mm. In addition, substrate 210 is a rectangular substrate with a long side in the X direction and a short side smaller than Py, and a plurality of light-emitting devices 220 is arranged in the X direction on substrate 210. The plurality of substrates 210 with a long side in the X direction is disposed in the Y direction with a distance therebetween. Alternatively, a plurality of substrates 210 with alongside in the Y direction may be disposed in the X direction with a distance therebetween.

Light Flux Controlling Member

Light flux controlling member 300 is an optical member that controls the distribution of light emitted from light-emitting element 220. In the present embodiment, light flux controlling member 300 is fixed on substrate 210. As illustrated in FIG. 4A, light flux controlling member 300 includes incidence surface 310 on which light from light-emitting element 220 impinges, total reflection surface 320 that reflects a part of the light entered from incidence surface 310, and emission surface 330 disposed at the periphery of total reflection surface 320. When a line extending along optical axis OA of light-emitting device is set as reference line L1, the light reflected by total reflection surface 320 and reached emission surface 330 is emitted from the emission surface at an angle larger than 90° with respect to reference line L1.

Light flux controlling member 300 is disposed over light-emitting element 220 such that central axis CA of incidence surface 310 matches optical axis OA of each light-emitting element 220. Note that, "optical axis OA of light-emitting element 220" refers to a central light beam of a three-dimensional emission light flux from light-emitting element 220. A gap for dissipating to the outside the heat emitted by light-emitting element 220 may or may not be formed between substrate 210 on which light-emitting element 220 is mounted and the rear surface of light flux controlling member 300.

Light flux controlling member 300 is formed by integral molding. The material of light flux controlling member 300 is not limited as long as the material can transmit light of a desired wavelength. For example, the material of light flux controlling member 300 is a light-transmissive resin such as polymethyl methacrylate (PMMA), polycarbonate (PC), epoxy resin (EP), polystyrene (PS), styrene-methyl methacrylate copolymer resin (MS), or silicone, or glass.

Specific configurations of light flux controlling member 300 are separately elaborated.

Light diffusion plate 120 is a plate-shaped member with light-diffusing properties, and transmits light emitted from light-emitting device 200 therethrough while diffusing the light. Normally, light diffusion plate 120 has substantially the same size as a display member such as a liquid crystal panel. For example, light diffusion plate 120 is formed from a light-transmissive resin such as polymethyl methacrylate (PMMA), polycarbonate (PC), polystyrene (PS), or styrene-methyl methacrylate copolymer resin (MS). To impart light-diffusing properties, minute irregularities are formed on the surface of light diffusion plate 120, or a light diffuser such as beads are dispersed inside light diffusion plate 120.

In surface light source device 100 according to the present embodiment, light emitted from each light-emitting element 220 is expanded by light flux controlling member 300 so as to illuminate a wide range of light diffusion plate 120. Light emitted from each light flux controlling member 300 is further diffused by light diffusion plate 120. The majority of light having reached light diffusion plate 120 is transmitted through light diffusion plate 120, while a part of the light is reflected by light diffusion plate 120. The majority of the light reflected by light diffusion plate 120 is reflected by substrate 210 or the inner surface of bottom plate 112 that functions as a diffusive reflection surface toward light diffusion plate 120 again. A part of the light reflected by light diffusion plate 120 is reflected by the rear surface or the front surface of light flux controlling member 300 toward light diffusion plate 120 again. As a result, surface light source device 100 according to the present embodiment can uniformly illuminate the planar display member (e.g., a liquid crystal panel). Note that, preferably a reflection member (reflection sheet) is disposed at bottom plate 112 of surface light source device 100.

Figure 4B:
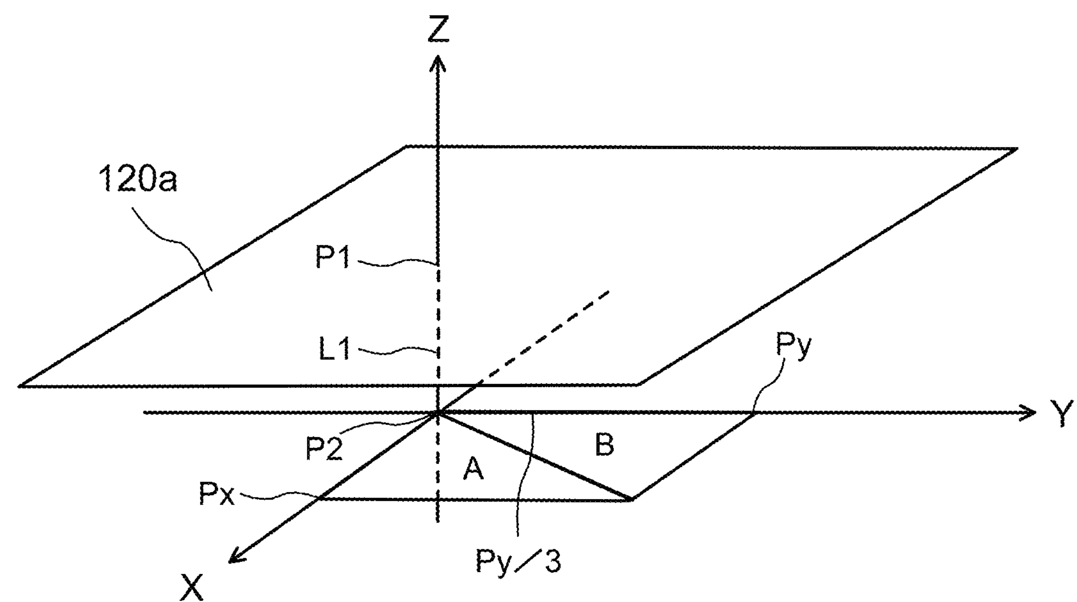
Figure 5A:
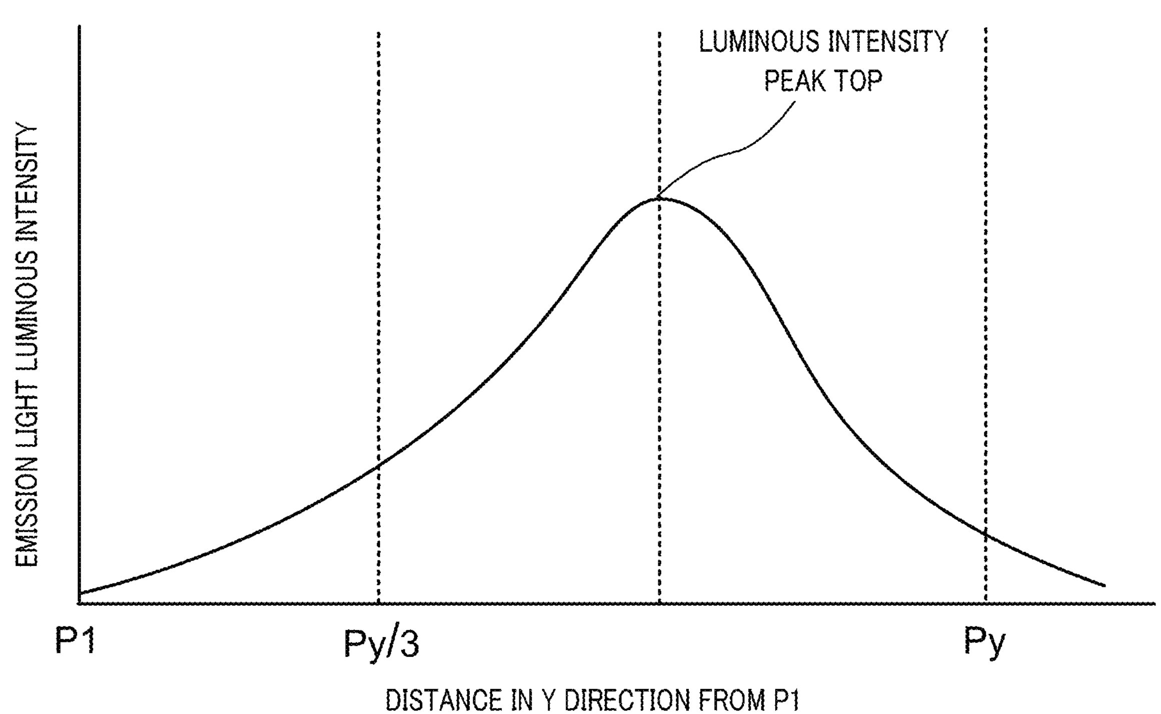
FIG. 5A is a graph based on light distribution characteristics.
Figure 5B:
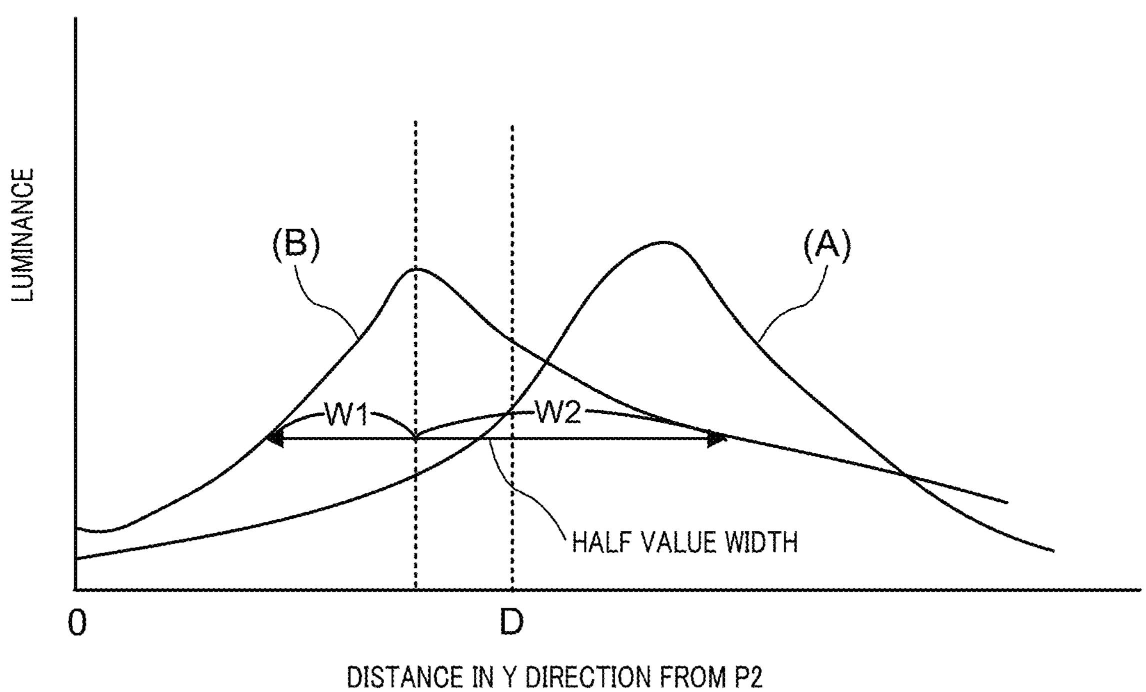
FIG. 5B is a graph illustrating a luminance distribution.

FIGS. 4B, 5A and 5B are diagrams for describing light distribution characteristics of the above-described surface light source device 100. More specifically, light is distributed as in the graph of FIGS. 5A and 5B when the reference point and region are defined in the following manner for a given light-emitting device among the plurality of light-emitting devices in surface light source device 100 as illustrated in FIG. 4B. In this manner, the degradation in image quality is suppressed even when distance OD changes. Below, the reference point and the like are described first, and then light distribution characteristics with the reference point or the like as a reference are described.

Specifically, as illustrated in FIG. 4B, reference line L1 is set as a line extending along optical axis OA of light-emitting element 220 of light-emitting device 200 (see FIG. 4A), first reference point P1 is set as the intersection of reference line L1 and light arrival plane 120*a* located on light-emitting device 200 side of light diffusion plate 120, and second reference point P2 is set as the intersection of reference line L1 and the XY plane. When a rectangular with two sides of length Px and length Py on the XY plane with the second reference point P2 as the vertex is divided into two by the diagonal line of the rectangular passing through second reference point P2, triangular region A is set as a triangular region with second reference point P2 located at the endpoint of the side with length Px and triangular region B is set as a triangular region with second reference point P2 located at the endpoint of the side with length Py.

In surface light source device 100, with the reference point and the like defined as described above as a reference, light is distributed in the following manner for a given light-emitting device 200.

Specifically, as illustrated in FIG. 5A, when the angle of light emitted from arbitrarily selected light-emitting element 220 along reference line L1 is set to 0°, the emission light luminous intensity from light-emitting device 200 is measured for light that is emitted at 0° to 90° from light-emitting element 220 corresponding to the light-emitting device 200 and is emitted along the YZ cross section. In the graph with the abscissa representing the distance from first reference point P1 of the arrival position in light arrival plane 120*a* of the emission light in the measurement angle range, and the ordinate representing the emission light luminous intensity of the emission angle reaching that position, the arrival position of the light beam corresponding to the luminous intensity peak top on light arrival plane 120*a* is within a range from Py/3 to Py from first reference point P1. This condition is appropriately referred to as Condition 1 hereafter.

In addition, when the arrival amount of the light reflected by total reflection surface 320 is compared between triangular region A and triangular region B, light reaches triangular region B more than triangular region A. This condition is appropriately referred to as Condition 2 hereafter.

In addition, as illustrated in FIG. 5B, consider a graph representing the luminance distribution of the luminance variation on the straight line extending along the Y direction and passing through second reference point P2 for the light reflected by total reflection surface 320 and reached the XY plane. In this graph, the following condition (A) or condition (B) is satisfied. (A) The position in the Y direction indicating the value of the luminance peak top is located at a position farther from second reference point P2 than distance D between the center of light flux controlling member 300 along the Y direction and the outer edge of light flux controlling member. (B) When the line segment corresponding to the half width of the luminance peak is divided into first division segment W1 nearer to reference line L1 than the peak top in the Y direction and second division segment W2 farther from reference line L1 than the peak top in the Y direction, the length of second division segment W2 is 1.5 times or greater than the length of first division segment W1. Hereafter, the condition (A) is appropriately referred to as Condition 3-1, and the condition (B) is appropriately referred to as Condition 3-2.

When satisfying the above-mentioned Condition 1, Condition 2, and Condition 3-1 or Condition 3-2, the surface light source device of the present invention can suppress degradation in image quality even when distance OD changes. Note that, this characteristic is also referred to as having high OD robustness.

Configuration of Light Flux Controlling Member

Light flux controlling members according to Embodiments 1 to 9 that can be used for the above-mentioned surface light source device are described below.

For the configuration of each light flux controlling member, the following description assumes that the light flux controlling member is placed in the XYZ coordinate. More specifically, the following description assumes that the light flux controlling member is rotationally symmetrical (about a two-fold symmetry axis) with the rotationally symmetry axis (two-fold symmetry axis) coinciding with the Z axis, that the rear surface of the light flux controlling member is placed on the XY plane, and that the major axis direction of light flux controlling member 400 in plan view is parallel to the Y direction. Here, the terms "coincide" and "parallel" are not limited to cases of perfect coincidence or perfect parallelism but also include cases where they are approximately coincident or approximately parallel within the precision range of the installation of the light controlling member. Hereinafter, hatching in the cross-sectional views of the light controlling member will be omitted.

Light Flux Controlling Member According to Embodiment 1

FIGS. 6A to 6E illustrate light flux controlling member 400 according to Embodiment 1.

Figure 6A:
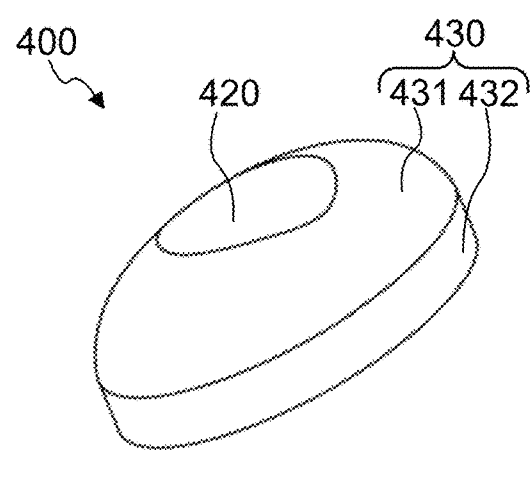
FIGS. 6A to 6F are diagrams illustrating a configuration of a light flux controlling member according to Embodiment 1.
Figure 6B:
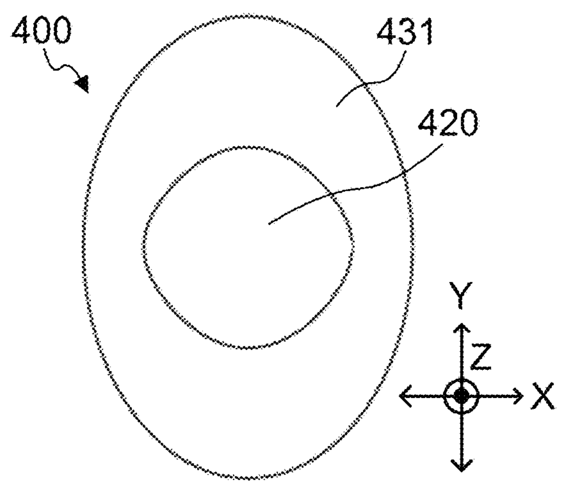
Figure 6C:
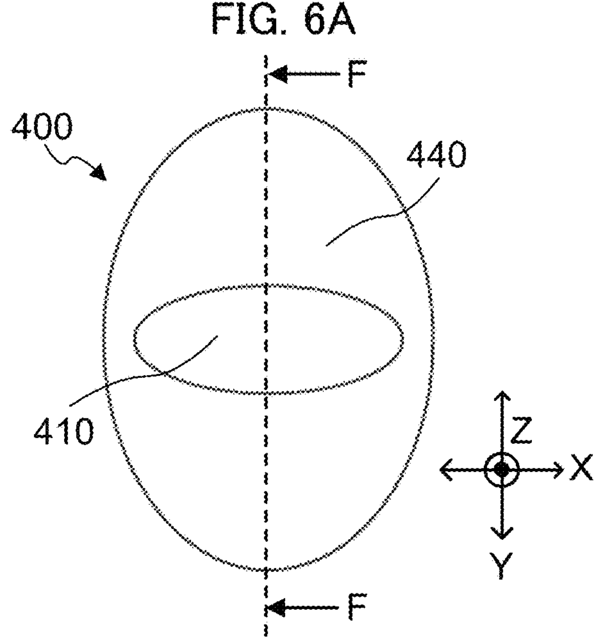
Figure 6D:
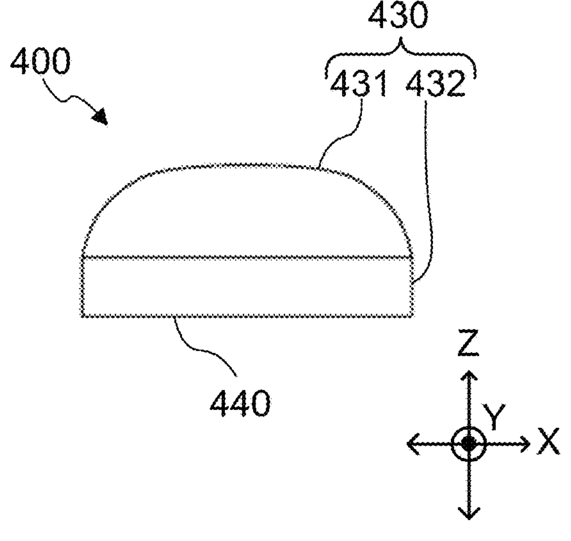
Figure 6E:
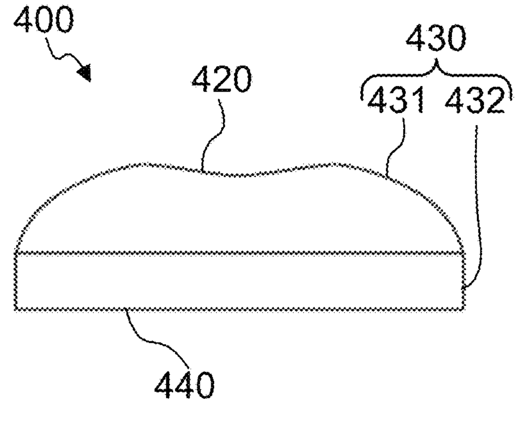
Figure 6F:
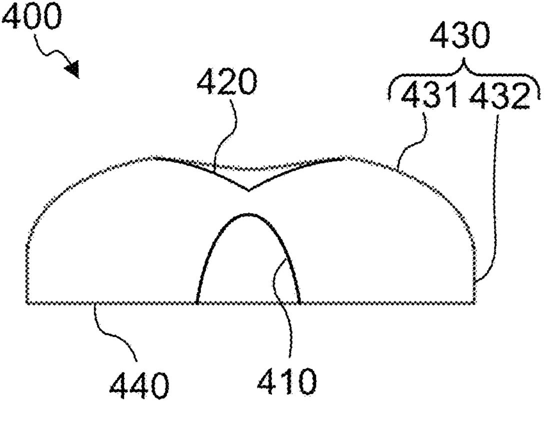

FIG. 6A is a perspective view of light flux controlling member 400 according to Embodiment 1 as viewed from the front side, FIG. 6B is a plan view, FIG. 6C is a bottom view, FIG. 6D is a front view, FIG. 6E is a side view, and FIG. 6F is a sectional view taken along line F-F of FIG. 6C.

As illustrated in FIGS. 6A to 6F, light flux controlling member 400 includes incidence surface 410, total reflection surface 420, and emission surface 430. In plan view and bottom view, light flux controlling member 400 have an ellipse shape with the major axis in the Y direction and the minor axis in the X direction. The ellipse has a major axis length of 4.73 mm and a minor axis length of 3.38 mm.

Incidence surface 410 is the inner surface of a recess that is disposed on the rear side of light flux controlling member 400 to intersect optical axis OA of light-emitting element 220, and allows incidence of light emitted from light-emitting element 220. In bottom view of light flux controlling member 400, incidence surface 410 has an ellipse shape with the minor axis in the Y direction and the major axis in the X direction. Incidence surface 410 is a curved surface. Incidence surface 410 is a curved surface in which the tangent to the curved surface approaches parallelism with the XY plane in the direction from rear surface 440 side of light flux controlling member 400 to the front side of light flux controlling member 400.

Total reflection surface 420 is the inner surface of a recess that is disposed on the front side of light flux controlling member 400 to intersect optical axis OA of light-emitting element 220, and reflects a part of the light entered from incidence surface 410. In the present embodiment, total reflection surface 420 is disposed on the side opposite to incidence surface 410 in light flux controlling member 400. In the present embodiment, total reflection surface 420 is a curved surface that is deepest at the intersection with the rotationally symmetry axis of the light flux controlling member, and gradually lowers in the Z direction from the intersection toward the outer edge of total reflection surface 420. The tangent to the curved surface gradually approaches parallelism with the XY plane toward the outer edge of the intersection total reflection surface.

In addition, in the present embodiment, total reflection surface 430 has a shape with a two-fold symmetry axis that is symmetric about the XZ plane and also about the YZ plane. The maximum length of total reflection surface 430 in the Y direction is substantially the same as the maximum length in the X direction. Substantially the same means it is within the range of ±5%.

Emission surface 430 is a surface that is disposed at the periphery of total reflection surface 420. Emission surface 430 includes first emission surface 431 and second emission surface 432. First emission surface 431 is located inside in emission surface 430, and second emission surface 432 is located outside in emission surface 430. In the present embodiment, first emission surface 431 mainly emits light that is emitted at a relatively small angle from optical axis OA of light-emitting element 220 to directly reach first emission surface 431 without reaching total reflection surface 420. On the other hand, second emission surface 430 mainly emits light reflected by total reflection surface 420 and light emitted at a large angle from optical axis OA.

The inner edge of first emission surface 431 is connected to the outer edge of total reflection surface 420. First emission surface 431 is a curved surface, and the tangent to the curved surface gradually approaches perpendicularity to the XY plane as the distance from the Z axis increases (toward the outer edge the inner edge of first emission surface 431).

Second emission surface 432 is disposed at the periphery of first emission surface 431. In the present embodiment, second emission surface 432 is perpendicular to the XY plane. The upper end of second emission surface 432 is connected to the outer edge of first emission surface 431, and the lower end of second emission surface 432 is connected to rear surface 440 of light flux controlling member 400.

Light Flux Controlling Member According to Embodiment 2

FIGS. 7A to 7F illustrate light flux controlling member 500 according to Embodiment 2.

Figures 7A, 7B, 7C, 7D, 7E, 7F:
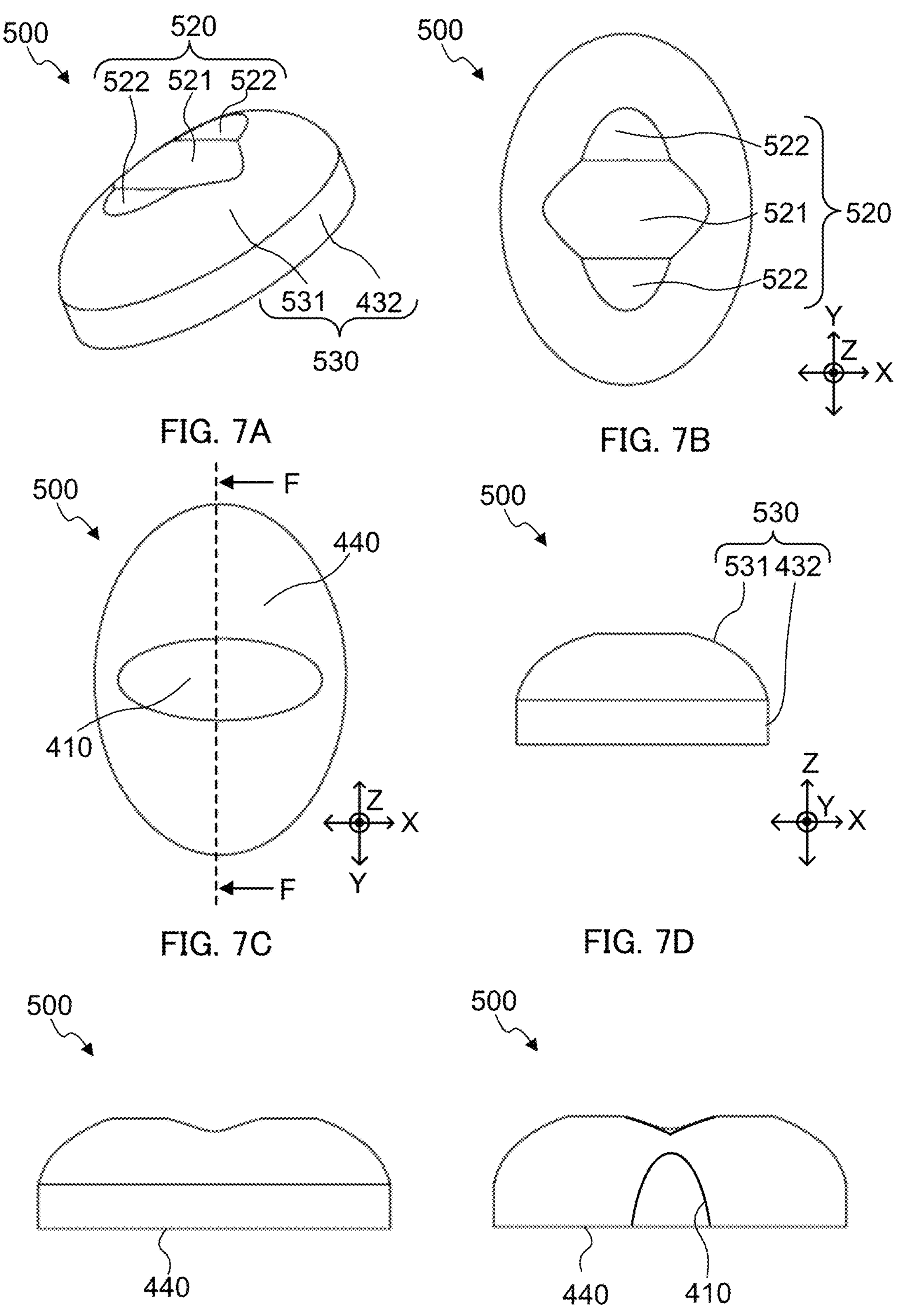
FIGS. 7A to 7F are diagrams illustrating a configuration of a light flux controlling member according to Embodiment 2.

FIG. 7A is a perspective view of light flux controlling member 500 according to Embodiment 2 as viewed from the front side, FIG. 7B is a plan view, FIG. 7C is a bottom view, FIG. 7D is a front view, FIG. 7E is a side view, and FIG. 7F is a sectional view taken along line F-F of FIG. 7C.

Light flux controlling member 500 according to Embodiment 2 is a variation of light flux controlling member 400 according to Embodiment 1. For light flux controlling member 500, the components similar to those of light flux controlling member 400 according to Embodiment 1 will be denoted with the same reference numerals and the description thereof will be omitted. In the following, for light flux controlling member 500, variations and changes from light flux controlling member 400 are mainly described.

Light flux controlling member 500 includes total reflection surface 520, and the configuration of total reflection surface 520 is different from that of total reflection surface 420 of light flux controlling member 400. As illustrated in FIG. 7A and the like, total reflection surface 520 includes first reflection surface 521 and two second total reflection surfaces 522. First total reflection surface 521 is the inner surface of a recess that is disposed on the front side of light flux controlling member 500 to intersect optical axis OA of light-emitting element 220. On the other hand, second reflection surface 522 is a surface that is disposed at a distance with first reflection surface 521 therebetween in the Y direction. In plan view, the maximum length in the Y direction of total reflection surface 520 with the above-mentioned configuration is greater than the maximum length in the X direction.

Total reflection surface 520 has a rotationally symmetry axis (two-fold symmetry axis) and is symmetric about the XZ plane. First reflection surface 521 is a curved surface with its tangent gradually approaches parallelism with the XY plane as the distance from the XZ plane increases. Second reflection surface 522 is a flat surface that is approximately parallel to the XY plane. Approximately parallel includes a range within ±5° for example.

Emission surface 530 is disposed at the periphery of the above-mentioned total reflection surface 520, and includes first emission surface 531 and second emission surface 432. First emission surface 531 is different from first emission surface 431 in that it connects total reflection surface 520 and second emission surface 432. Other configurations and the like of first emission surface 531 are the same as those of first emission surface 431.

Light Flux Controlling Member According to Embodiment 3

FIGS. 8A to 8F illustrate light flux controlling member 600 according to Embodiment 3.

FIG. 8A is a perspective view of light flux controlling member 600 according to Embodiment 3 as viewed from the front side, FIG. 8B is a plan view, FIG. 8C is a bottom view, FIG. 8D is a front view, FIG. 8E is a side view, and FIG. 8F is a sectional view taken along line F-F of FIG. 8C.

Light flux controlling member 600 according to Embodiment 3 is a variation of Embodiment 2, and the components similar to those of light flux controlling member 500 according to Embodiment 2 will be denoted with the same reference numerals and the description thereof will be omitted. In the following, for light flux controlling member 600, variations and changes from light flux controlling member 500 are mainly described.

Light flux controlling member 600 includes incidence surface 610, and the configuration of incidence surface 610 is different from that of the incidence surface 510 of light flux controlling member 500. As illustrated in FIG. 8F, incidence surface 610 includes first incidence surface 611, and second incidence surface 612. First incidence surface 611 is in connect with rear surface 440 of light flux controlling member 600 and close to rear surface 440, and second incidence surface 612 is farther from rear surface 440 of light flux controlling member 600. First incidence surface 611 is a curved surface in which its tangent approaches parallelism with the XY plane in the direction from rear surface 440 toward the front side of light flux controlling member 600. Second incidence surface 612 is a curved surface in which its tangent approaches perpendicularity to the XY plane in the direction from rear surface 440 side toward the front side. The tangent to first incidence surface 611 has a slope closer to being perpendicular to the XY plane than the tangent to second incidence surface 612.

Light flux controlling member 600 includes total reflection surface 620, and the configuration of total reflection surface 620 is different from that of light flux controlling member 500. As illustrated in FIG. 8A, total reflection surface 620 has a shape that is symmetric about the XZ plane. Total reflection surface 620 is a curved surface that is tilted toward the XY plane as the distance of its tangent from the XZ plane increases.

Connection surface 621 is a flat surface that connects total reflection surface 620 and emission surface 630.

Emission surface 630 includes first emission surface 631 and second emission surface 432. First emission surface 631 is disposed between and connected to total reflection surface 620 and second emission surface 432.

Light Flux Controlling Member According to Embodiment 4

FIGS. 9A to 9F illustrate light flux controlling member 700 according to Embodiment 4.

FIG. 9A is a perspective view of light flux controlling member 700 according to Embodiment 4 as viewed from the front side, FIG. 9B is a plan view, FIG. 9C is a bottom view, FIG. 9D is a front view, FIG. 9E is a side view, and FIG. 9F is a sectional view taken along line F-F of FIG. 9C.

Light flux controlling member 700 according to Embodiment 4 is a variation of Embodiment 3, and the components similar to those of light flux controlling member 600 according to Embodiment 3 will be denoted with the same reference numerals and the description thereof will be omitted. In the following, for light flux controlling member 700, variations and changes from light flux controlling member 600 are mainly described.

Light flux controlling member 700 includes total reflection surface 720, and the configuration of total reflection surface 720 is different from that of light flux controlling member 600. As illustrated in FIG. 9A, total reflection surface 720 is in smooth connection with connection surface 721. Connection surface 721 is disposed between and connected to total reflection surface 720 and the emission surface.

Emission surface 730 includes first emission surface 731 and second emission surface 432. First emission surface 731 is disposed between and connected to total reflection surface 720 and second emission surface.

Light Flux Controlling Member According to Embodiment 5

FIGS. 10A to 10F illustrate light flux controlling member 800 according to Embodiment 5.

Figures 10A, 10B, 10C, 10D, 10E, 10F:
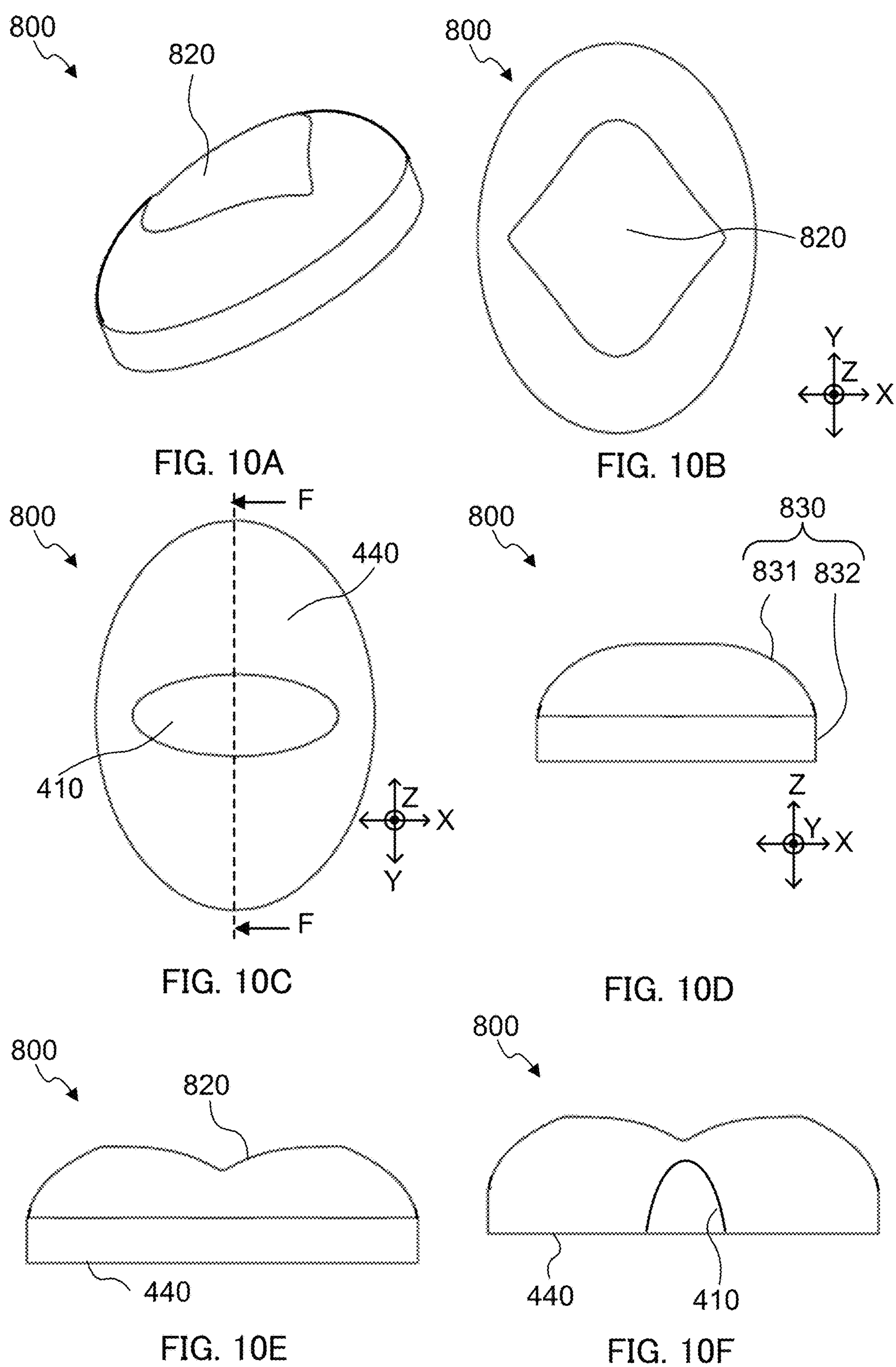
FIGS. 10A to 10F are diagrams illustrating a configuration of a light flux controlling member according to Embodiment 5.

FIG. 10A is a perspective view of light flux controlling member 800 according to Embodiment 5 as viewed from the front side, FIG. 10B is a plan view, FIG. 10C is a bottom view, FIG. 10D is a front view, FIG. 10E is a side view, and FIG. 10F is a sectional view taken along line F-F of FIG. 10C.

Light flux controlling member 800 according to Embodiment 5 is a variation of Embodiment 2, and the components similar to those of light flux controlling member 500 according to Embodiment 2 will be denoted with the same reference numerals and the description thereof will be omitted. In the following, for light flux controlling member 800, variations and changes from light flux controlling member 500 are mainly described.

Light flux controlling member 800 has an elliptical shape in plan view. This elliptical shape is larger than the elliptical shape of Embodiment 2. More specifically, the ellipse has a major axis of 5.20 mm and a minor axis of 3.72 mm.

Light flux controlling member 800 includes total reflection surface 820, and the configuration of total reflection surface 820 is different from that of light flux controlling member 500. As illustrated in FIG. 10A, total reflection surface 820 is a curved surface in which its tangent approaches parallelism with the XY plane as the distance from the XZ plane increases. In plan view of total reflection surface 820, the maximum length in the Y direction is greater than the maximum length in the X direction.

Emission surface 830 includes first emission surface 831 and second emission surface 832. First emission surface 831 connects total reflection surface 820 and second emission surface 832. Second emission surface 832 is perpendicular to the XY plane.

Light Flux Controlling Member According to Embodiment 6

FIGS. 11A to 11F illustrate light flux controlling member 900 according to Embodiment 6.

Figure 11A:
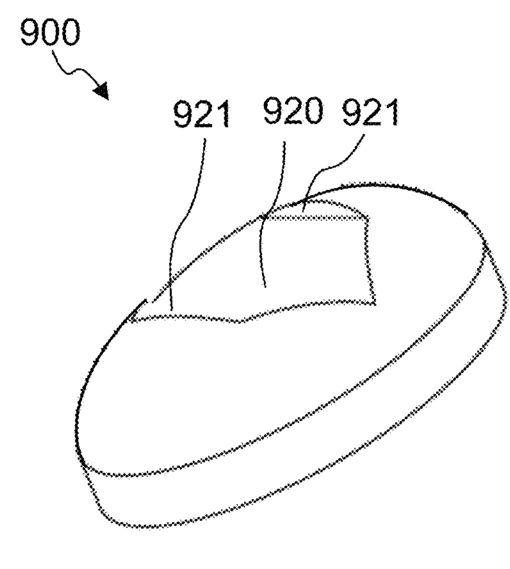
FIGS. 11A to 11F are diagrams illustrating a configuration of a light flux controlling member according to Embodiment 6.
Figure 11B:
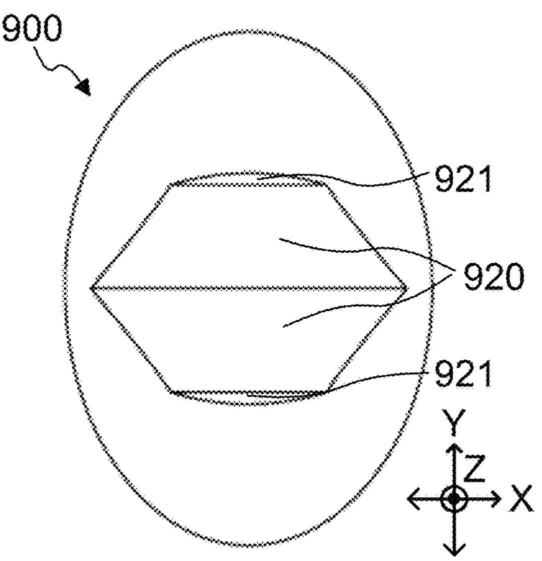
Figure 11C:
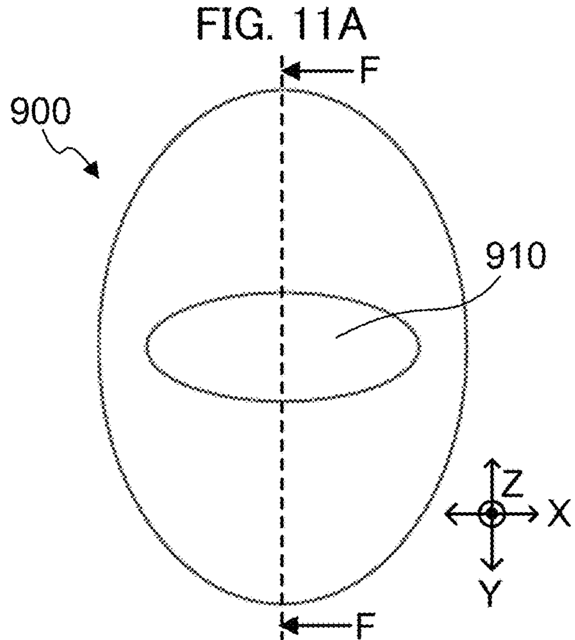
Figure 11D:
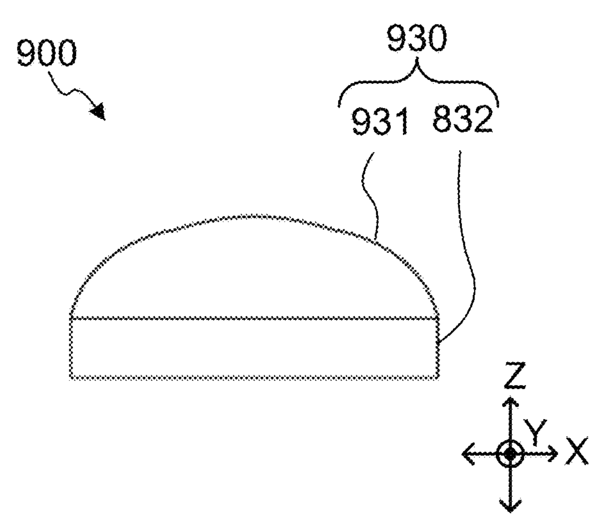
Figure 11E:
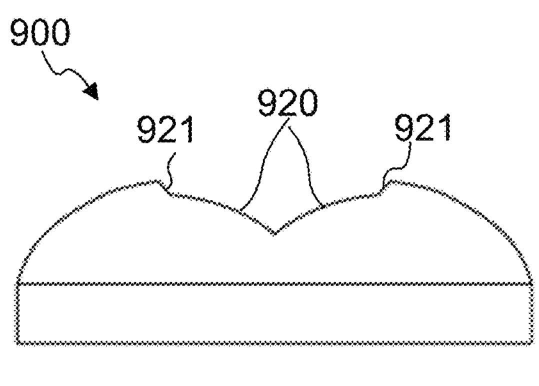
Figure 11F:
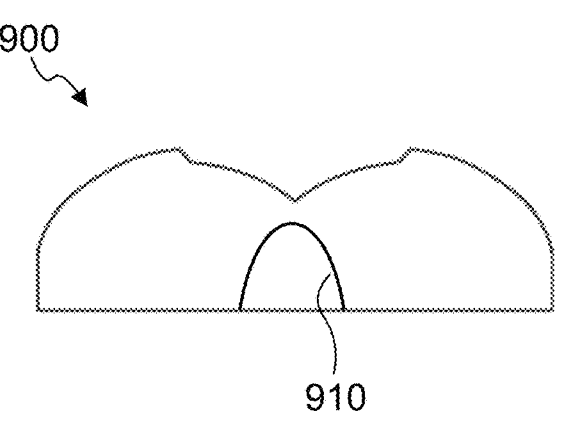

FIG. 11A is a perspective view of light flux controlling member 900 according to Embodiment 6 as viewed from the front side. FIG. 11B is a plan view, FIG. 11C is a bottom view, FIG. 11D is a front view, FIG. 11E is a side view, and FIG. 11F is a sectional view taken along line F-F of FIG. 11C.

Light flux controlling member 900 according to Embodiment 6 is a variation of light flux controlling member 800 according to Embodiment 5, and the components similar to those of Embodiment 5 will be denoted with the same reference numerals and the description thereof will be omitted.

Light flux controlling member 900 includes incidence surface 910. The height of incidence surface 910 is slightly smaller than that of incidence surface 410, and the diameter of incidence surface 910 is the same as that of incidence surface 410.

Light flux controlling member 900 includes total reflection surface 920. Total reflection surface 920 is a curved surface in which its tangent approaches parallelism with the XY plane as the distance from the XZ plane increases. In plan view of total reflection surface 920, the maximum length in the X direction is greater than the maximum length in the Y direction.

Connection surface 921 is disposed between and connected to total reflection surface 920 and emission surface 930. The connection surface is a flat surface.

Emission surface 930 includes first emission surface 931 and second emission surface 832. First emission surface 931 is disposed between and connected to total reflection surface 920 and second emission surface 832.

Light Flux Controlling Member According to Embodiment 7

FIGS. 12A to 12F illustrate light flux controlling member 1000 according to Embodiment 7.

FIG. 12A is a perspective view of light flux controlling member 1000 according to Embodiment 7 as viewed from the front side, FIG. 12B is a plan view, FIG. 12C is a bottom view, FIG. 12D is a front view, FIG. 12E is a side view, and FIG. 12F is a sectional view taken along line F-F of FIG. 12C.

Light flux controlling member 1000 according to Embodiment 7 is a variation of light flux controlling member 800 according to Embodiment 5, and the components similar to those of Embodiment 5 will be denoted with the same reference numerals and the description thereof will be omitted.

Emission surface 1030 includes first emission surface 831 and second emission surface 1032. First emission surface 831 is disposed between and connected to total reflection surface 820 and second emission surface 1032.

As illustrated in FIG. 12E, when viewed along the X direction, second emission surface 1032 is tilted away from the Z axis in the direction away from the XY plane to the Z direction increases.

Light Flux Controlling Member According to Embodiment 8

FIGS. 13A to 13F illustrate light flux controlling member 1100 according to Embodiment 8.

Figure 13A:
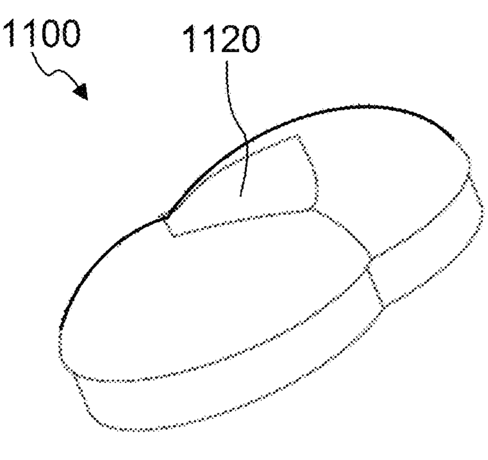
FIGS. 13A to 13F are diagrams illustrating a configuration of a light flux controlling member according to Embodiment 8.
Figure 13B:
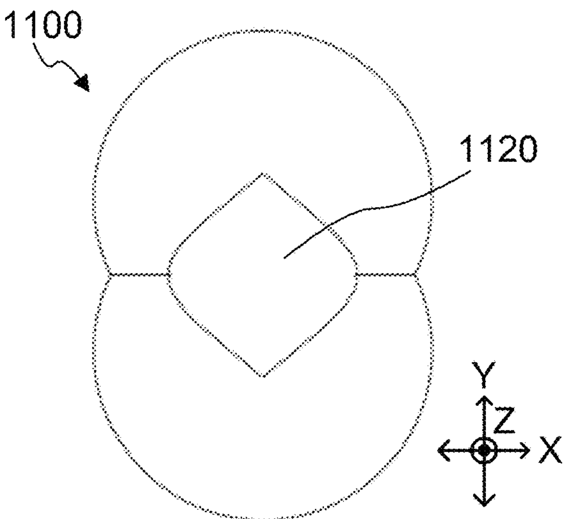
Figure 13C:
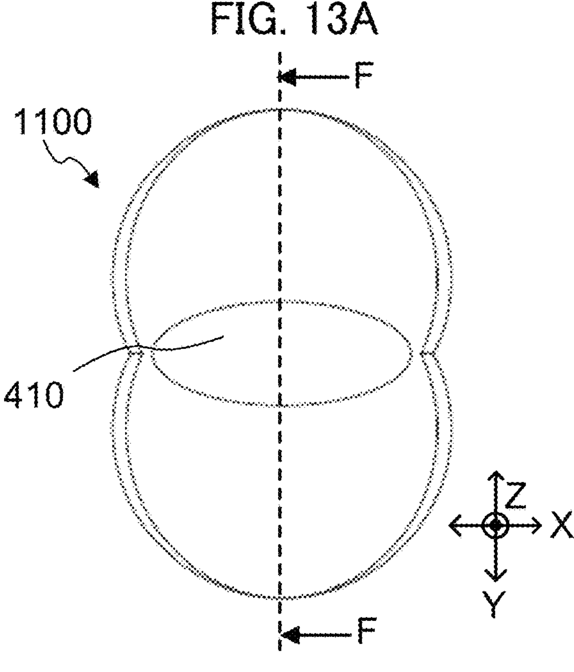
Figure 13D:
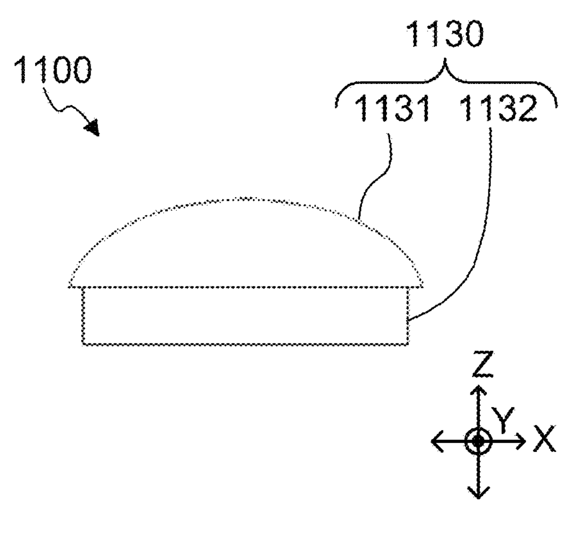
Figure 13E:
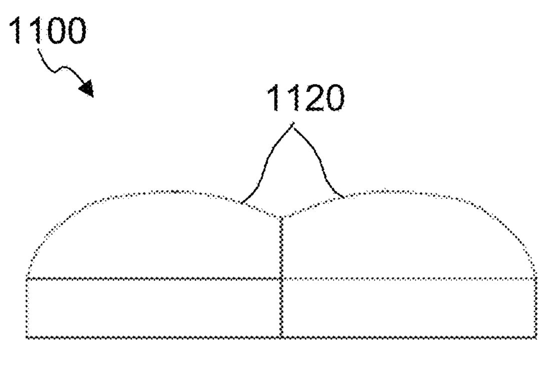
Figure 13F:
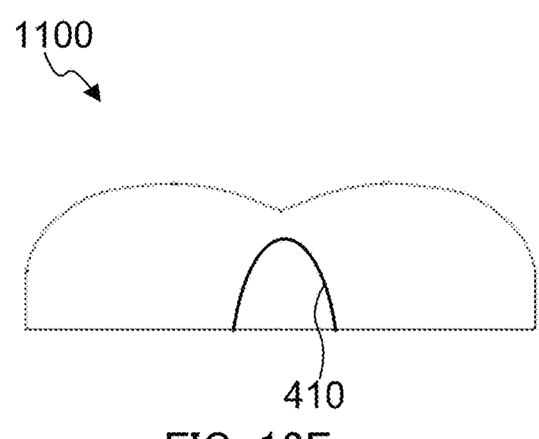

FIG. 13A is a perspective view of light flux controlling member 1100 according to Embodiment 8 as viewed from the front side, FIG. 13B is a plan view, FIG. 13C is a bottom view, FIG. 13D is a front view, FIG. 13E is a side view, and FIG. 13F is a sectional view taken along line F-F of FIG. 13C.

Light flux controlling member 1100 according to Embodiment 8 is a variation of light flux controlling member 800 according to Embodiment 5, and the components similar to those of Embodiment 5 will be denoted with the same reference numerals and the description thereof will be omitted.

In plan view and bottom view, light flux controlling member 1100 has an ellipse shape with a constriction in a half length of the length in the Y direction.

Light flux controlling member 1100 includes total reflection surface 1120. Total reflection surface 1120 is a curved surface that approaches parallelism with the XY plane as the distance from the XZ plane increases. In plan view of total reflection surface 1120, the maximum length in the Y direction and the maximum length in the X direction are substantially the same. Substantially the same means it is within the range of 5%.

Light flux controlling member 1100 includes emission surface 1130. Emission surface 1130 includes first emission surface 1131 and second emission surface 1132. First emission surface 1131 is a curved surface that approaches perpendicularity to the XY plane as the distance from the XZ plane increases. Second emission surface 1132 is a surface that is perpendicular to the XY plane.

Light Flux Controlling Member According to Comparative Example 1

FIGS. 14A to 14F illustrate light flux controlling member 1200 according to Comparative Example 1.

Figures 14A, 14B, 14C, 14D, 14E, 14F:
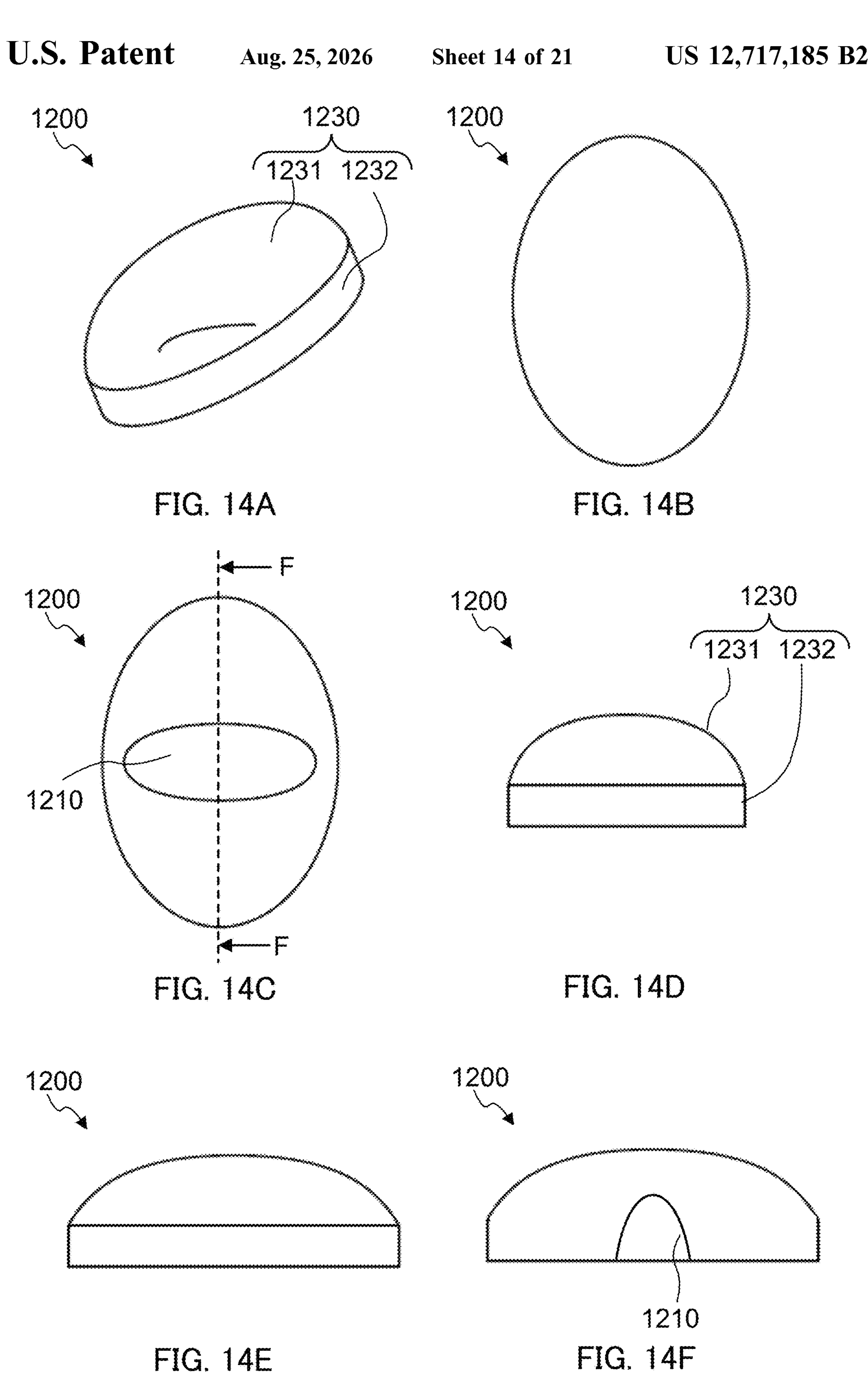
FIGS. 14A to 14F are diagrams illustrating a configuration of a light flux controlling member according to a Comparative Example 1.

FIG. 14A is a perspective view of light flux controlling member 1200 according to a comparative example as viewed from the front side, FIG. 14B is a plan view, FIG. 14C is a bottom view, FIG. 14D is a front view, FIG. 14E is a side view, and FIG. 14F is a sectional view taken along line F-F of FIG. 14C.

Light flux controlling member 1200 includes incidence surface 1210 and emission surface 1230, but does not include the total reflection surface.

Light Flux Controlling Member According to Comparative Example 2

FIGS. 15A to 15F illustrate light flux controlling member 1300 according to Comparative Example 2.

Figures 15A, 15B, 15C, 15D, 15E, 15F:
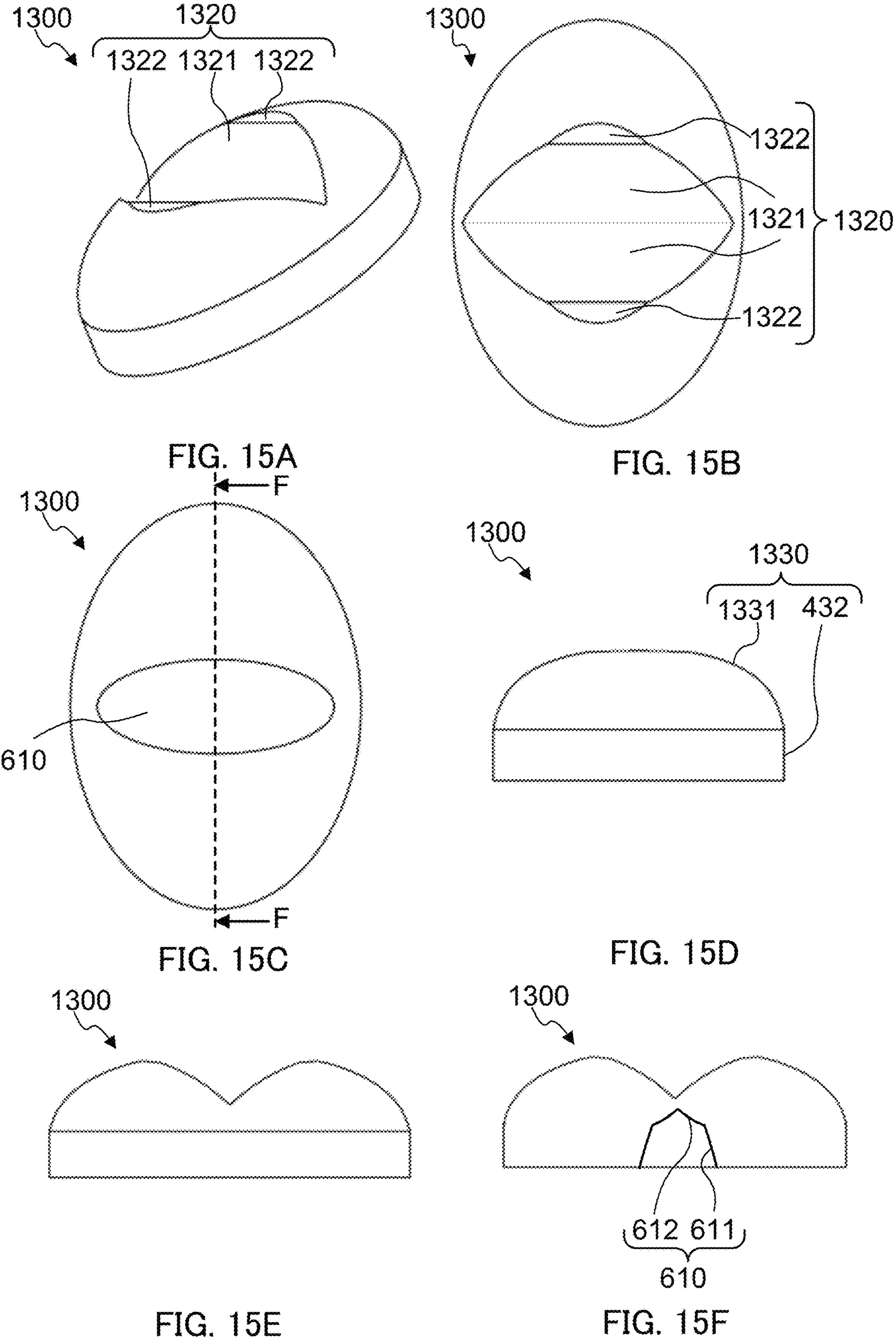
FIGS. 15A to 15F are diagrams illustrating a configuration of a light flux controlling member according to a Comparative Example 2.

FIG. 15A is a perspective view of light flux controlling member 1300 according to a comparative example as viewed from the front side, FIG. 15B is a plan view, FIG. 15C is a bottom view, FIG. 15D is a front view, FIG. 15E is a side view, and FIG. 15F is a sectional view taken along line F-F of FIG. 15C.

Light flux controlling member 1300 is a variation of light flux controlling member 600 according to Embodiment 3. The components of light flux controlling member 1300 similar to those of light flux controlling member 600 will be denoted with the same reference numerals and the description thereof will be omitted.

Light flux controlling member 1300 includes total reflection surface 1320. Total reflection surface 1320 includes first total reflection surface 1321 and second total reflection surface 1322. First total reflection surface 1321 is a curved surface in which its tangent approaches parallelism with the XY plane as the distance from the XZ plane increases. Second total reflection surface 1322 is a flat surface that is approximately parallel to the XY plane.

Light flux controlling member 1300 includes emission surface 1330. Emission surface 1330 includes first emission surface 1331 and second emission surface 432. First emission surface 1331 is disposed between and connected to total reflection surface 1320 and second emission surface 432.

Simulations

Simulations were conducted for surface light source devices respectively including the above-described light flux controlling members to examine whether Condition 1 to Condition 3-2 are satisfied. In the simulation, Py was set to 35 mm and Px was set to 14 mm. In addition, OD was set to 5 mm.

Condition 1

A simulation of Condition 1 was conducted for the light flux controlling members according to the above-described Embodiments 1 to 8, and Comparative Examples 1 and 2. The result of the simulation is shown in Table 1. Condition 1 is that for light emitted from a light-emitting element at 0° to 90°, in a graph illustrating light distribution characteristics on the YZ cross section related to the emission light luminous intensity from the light-emitting device, the position on the light arrival plane where the light beam corresponding to the luminous intensity peak top reaches is within a range from Py/3 to Py from first reference point P1. Here, Py was set to 35 mm, and Py/3 was set to approximately 11.7 mm. Table 1 shows the distance (mm) from first reference point P1 of the point where the light beam corresponding to the luminous intensity peak top reaches on the light arrival plane. When this distance is within a range from 11.7 mm to 35 mm, Condition 1 is satisfied.

Figure 16A:
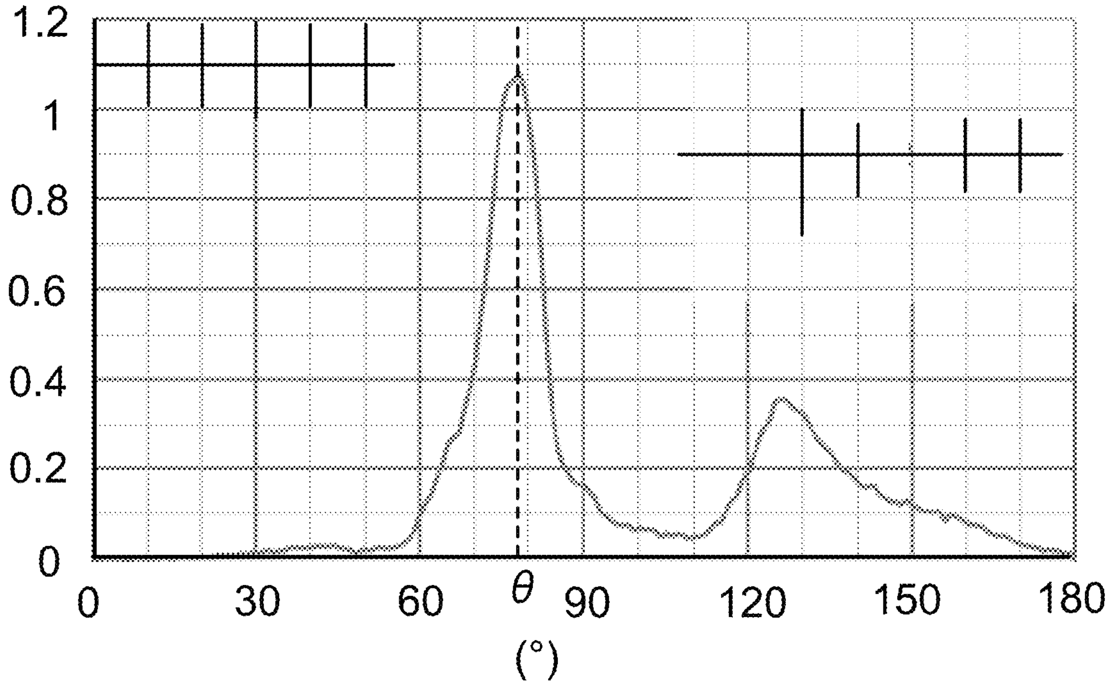
FIGS. 16A and 16B are diagrams for describing a simulation.
Figure 16B:
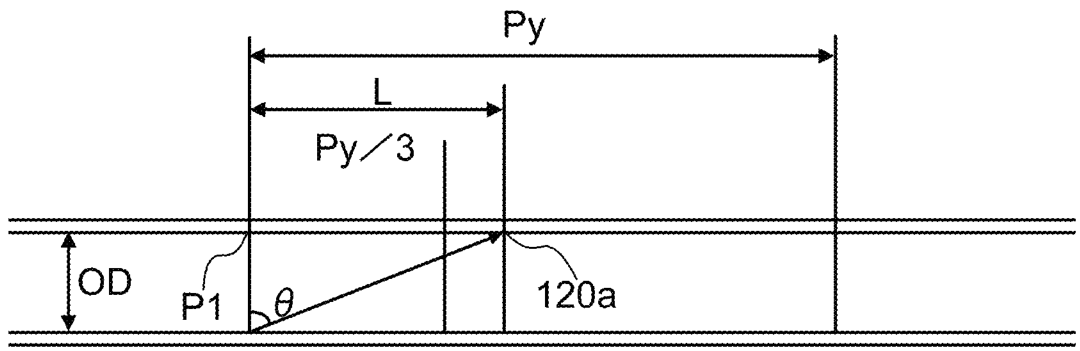
Figure 17A:
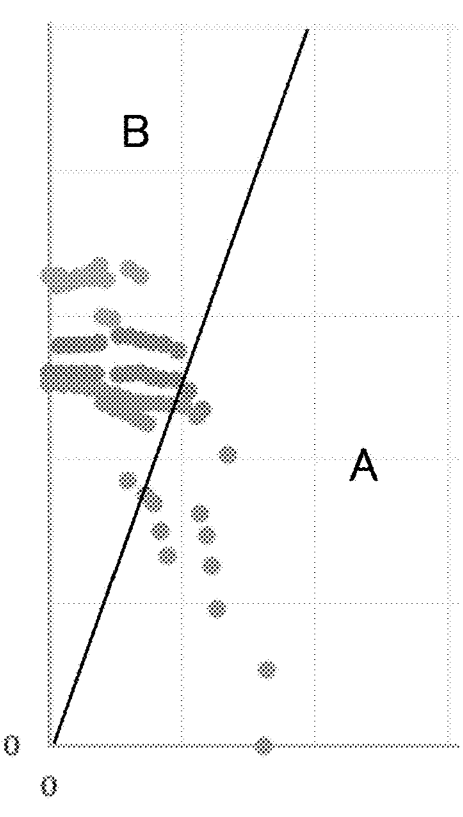
FIGS. 17A to 17D illustrate a simulation.
Figure 17B:
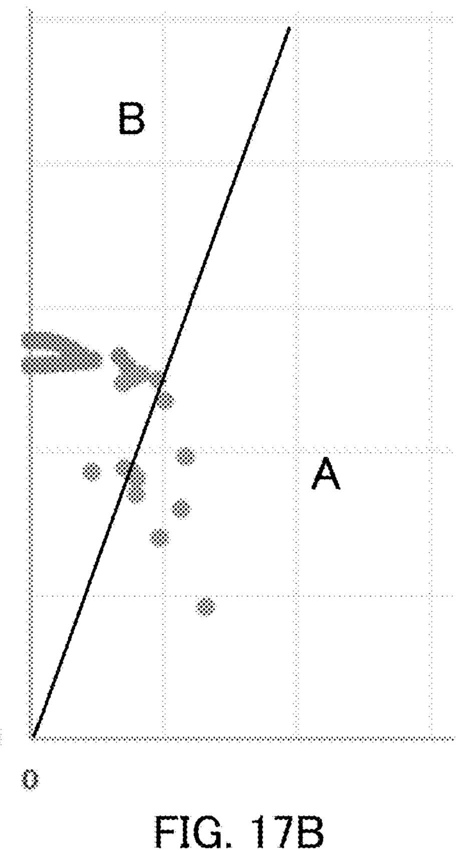
Figure 17C:
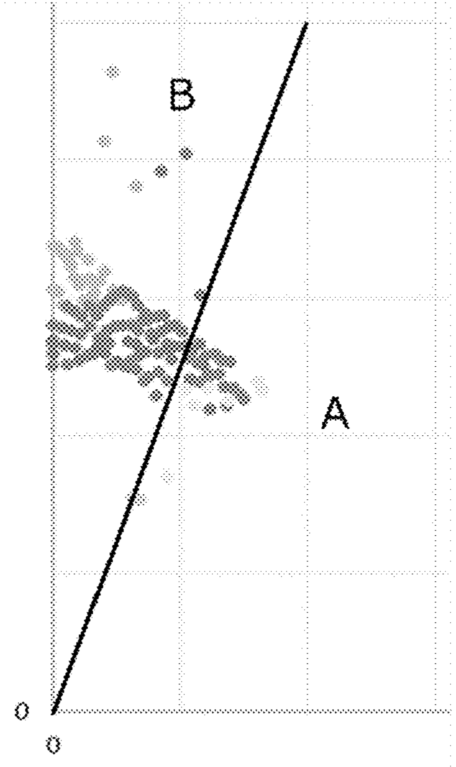
Figure 17D:
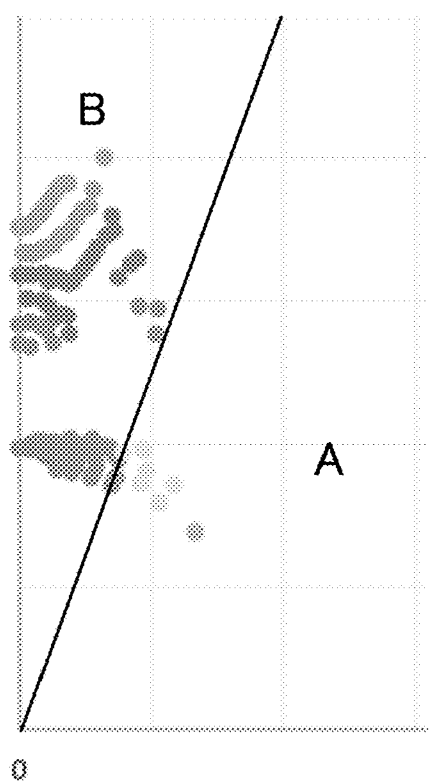
Figure 18A:
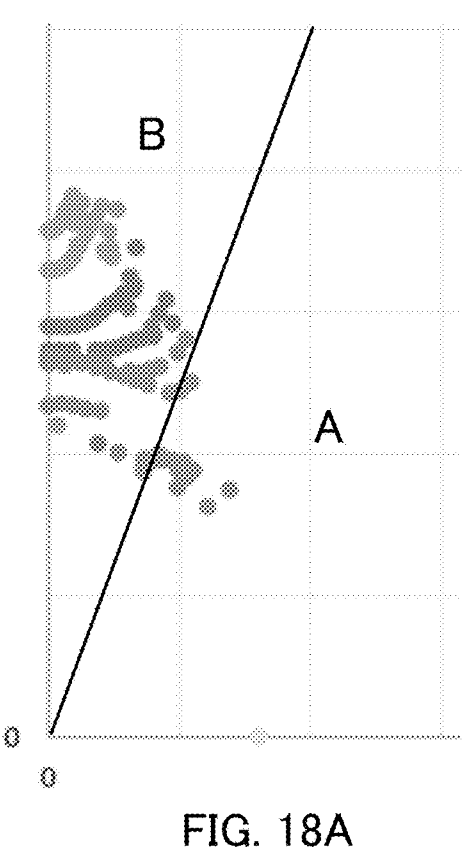
FIGS. 18A to 18D illustrate a simulation.
Figure 18B:
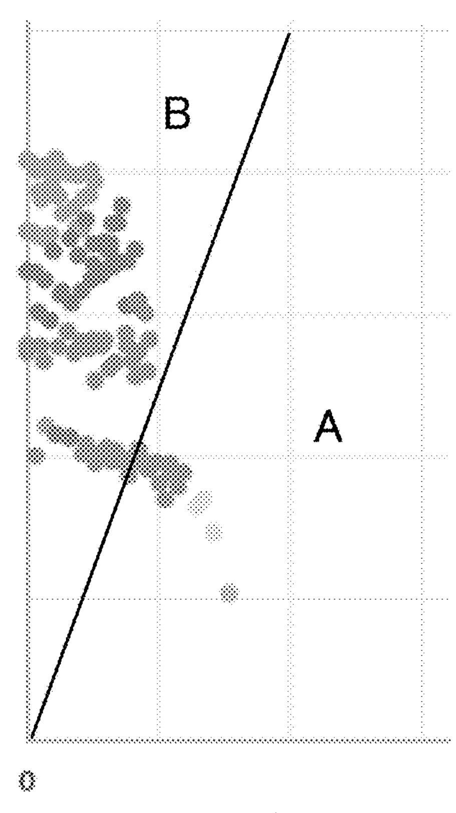
Figure 18C:
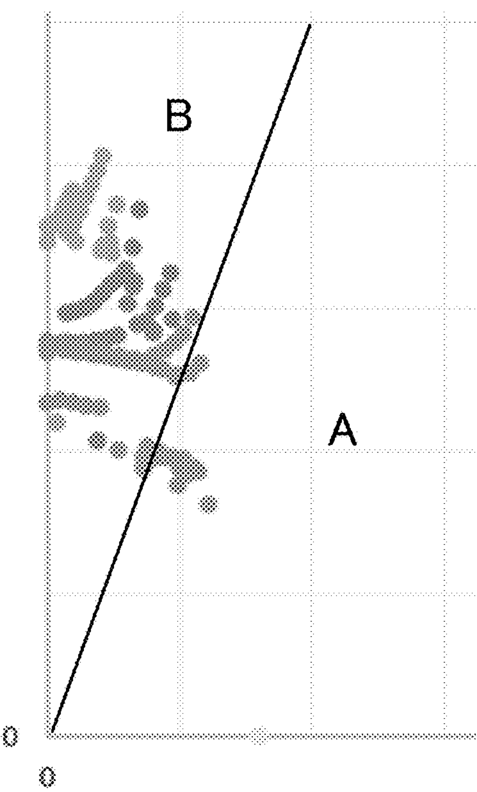
Figure 18D:
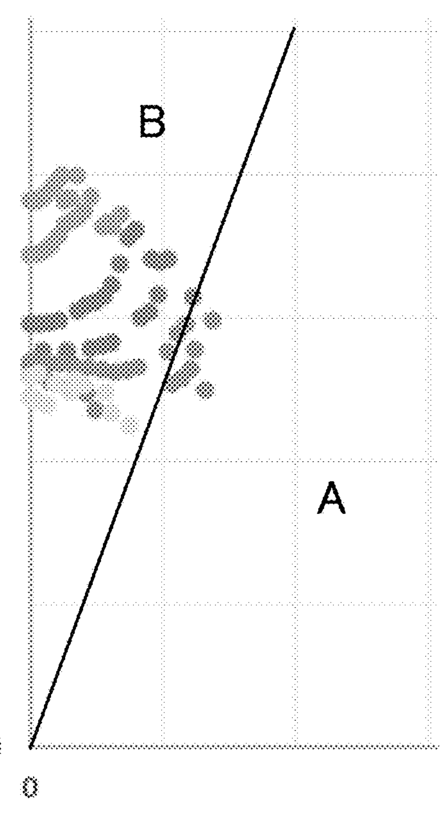

More specifically, through a simulation, as illustrated in FIG. 16A, a graph illustrating light distribution characteristics on the YZ cross section related to the emission light luminous intensity from the light-emitting device was obtained for light emitted from a light-emitting element at 0° to 90°. Note that, the simulation was conducted under a condition with only the light-emitting element and the light flux controlling member. In addition, light emitted from the light-emitting element was set to have a Lambertian light distribution. Further, the luminous intensity peak top angle θ(°) was obtained from the graph. As illustrated in FIG. 16B, from this luminous intensity peak top angle θ(°), the distance L of the point where a light beam corresponding to the peak top reaches on light arrival plane 120*a* from first reference point P1 was determined from $L=OD\times\tan\theta$. Table 1 shows the luminous intensity peak top angle θ(°), distance L, and whether Condition 1 was satisfied in each example and each comparative example.

TABLE 1

| Light Flux Controlling Member | Luminous Intensity Peak Top Angle θ(°) | Distance L (mm) | Condition 1 |
|---|---|---|---|
| Embodiment 1 | 74 | 17.4 | Good |
| Embodiment 2 | 76 | 20.1 | Good |
| Embodiment 3 | 75 | 18.7 | Good |
| Embodiment 4 | 78 | 23.5 | Good |
| Embodiment 5 | 78 | 23.5 | Good |
| Embodiment 6 | 78 | 23.5 | Good |
| Embodiment 7 | 78 | 23.5 | Good |
| Embodiment 8 | 78 | 23.5 | Good |
| Comparative Example 1 | 77 | 21.7 | Good |
| Comparative Example 2 | 75 | 18.7 | Good |

As is clear from Table 1, Condition 1 was satisfied in all of Embodiments 1 to 8 and Comparative Examples 1 and 2.

Condition 2

Figure 19A:
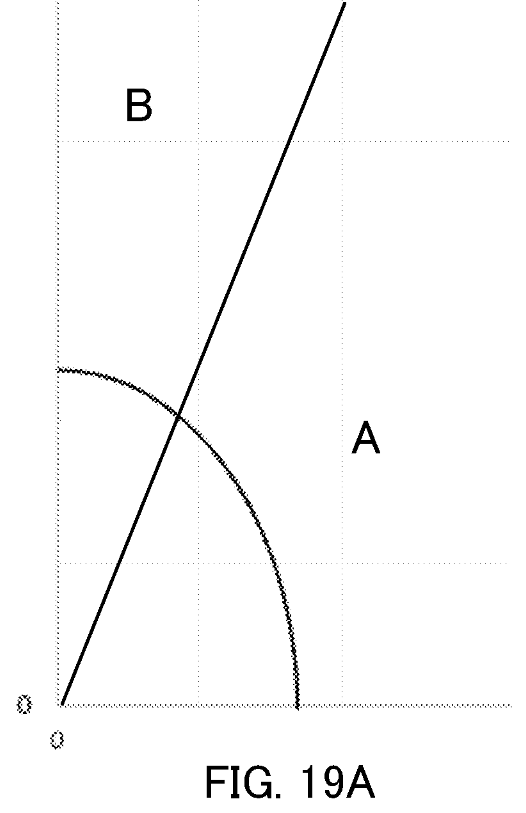
FIGS. 19A and 19B illustrate a simulation.
Figure 19B:
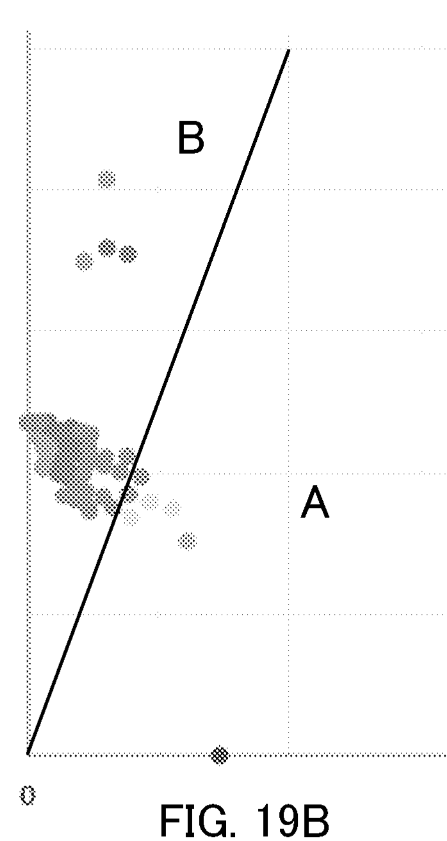

A simulation of Condition 2 was conducted for the light flux controlling members according to the above-described Embodiments 1 to 8, and Comparative Examples 1 and 2. FIGS. 17A to 17D illustrate the result of the simulation, FIGS. 18A to 18D illustrate results of Embodiments 1 to 8, and FIGS. 19A and 19B illustrate results of Comparative Examples 1 and 2. In addition, the straight line illustrated in each drawing is the boundary line for dividing the above-described triangular regions A and B, and the curve line of FIG. 19A represents an external shape of the flux controlling member in plan view. Note that, Condition 2 is that when the above-described triangular region A and triangular region B are compared in terms of the arrival amount of the light reflected by the total reflection surface, the light reaches triangular region B more than triangular region A.

In the graphs of FIGS. 17A to 17D, FIGS. 18A to 18D and FIGS. 19A and 19B, each plot represents the position where the light beam reflected by total reflection surface reaches in triangular regions A and B. As is clear from FIGS. 17A to 17D and FIGS. 18A to 18D, the light beam reached triangular region B more than triangular region A in Embodiments 1 to 8 in all cases. On the other hand, as is clear from FIG. 19A, no light beam reached triangular regions A and B in Comparative Example 1. In addition, as is clear from FIG. 19B, light reached triangular region B more than triangular region A in Comparative Example 2. That is, Embodiments 1 to 8 and Comparative Example 2 satisfied Condition 2. On the other hand, Comparative Example 1 did not satisfy Condition 2.

Conditions 3-1 and 3-2

Figure 20A:
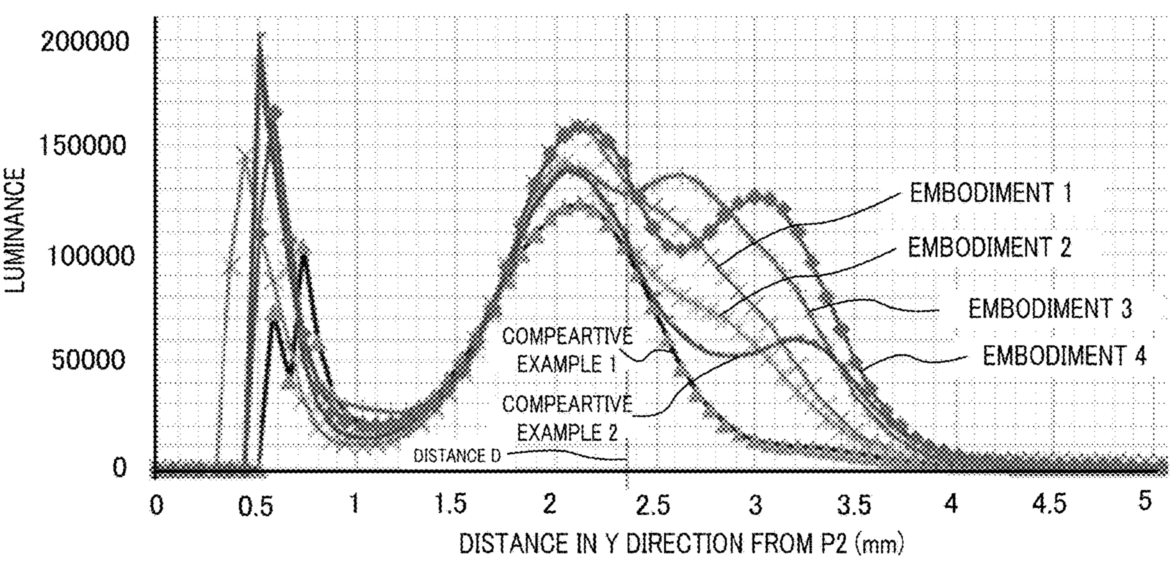
FIGS. 20A and 20B illustrate a measurement result.
Figure 20B:
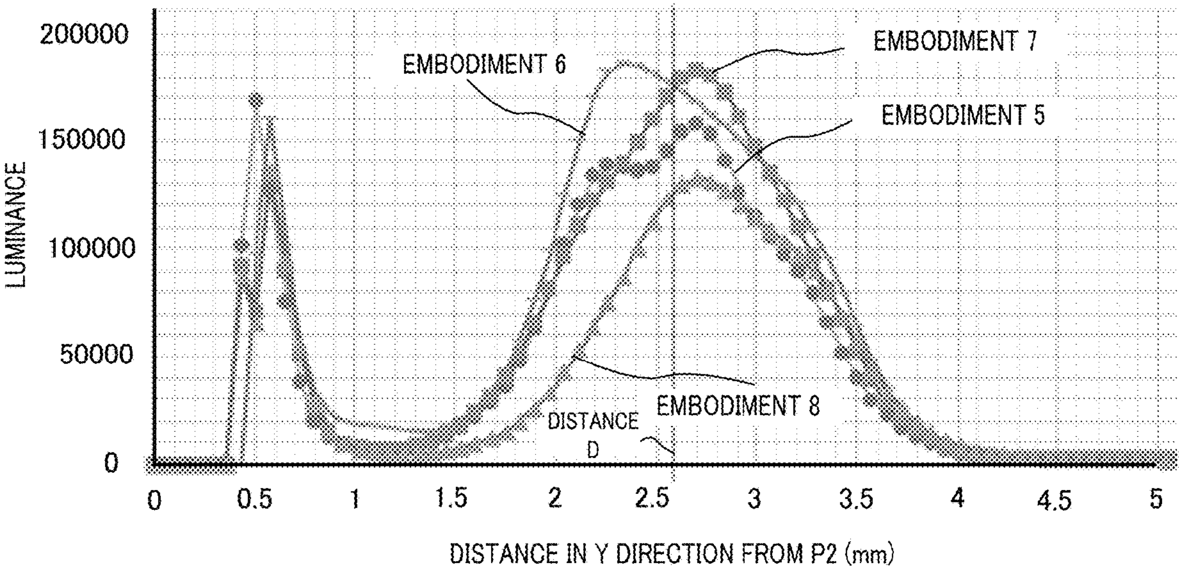

With the light flux controlling members according to the above-described Embodiments 1 to 8, and Comparative Examples 1 and 2, measurement was conducted for Conditions 3-1 and 3-2. The measurement results (luminance distribution graphs) are shown in FIGS. 20A and 20B. Note that, Condition 3-1 is that for light reflected by the total reflection surface and reached the XY plane, in a graph representing the luminance distribution of the luminance variation on the straight line extending along the Y direction and passing through second reference point P2, (A) the position in the Y direction indicating the luminance peak top is at a position farther from the second reference point than distance D between the outer edge of the light flux controlling member and the center of the light flux controlling member along the Y direction. In addition, Condition 3-2 is that for light reflected by the total reflection surface and reached the XY plane, in a graph representing the luminance distribution of the luminance variation on the straight line extending along the Y direction and passing through second reference point P2, (B) when the line segment corresponding to the half width of the luminance peak is divided into first division segment W1 nearer to reference line L1 than the peak top in the Y direction and second division segment W2 farther from reference line L1 than the peak top in the Y direction, the length of second division segment W2 is 1.5 times or greater than the length of first division segment W1.

Figure 21:
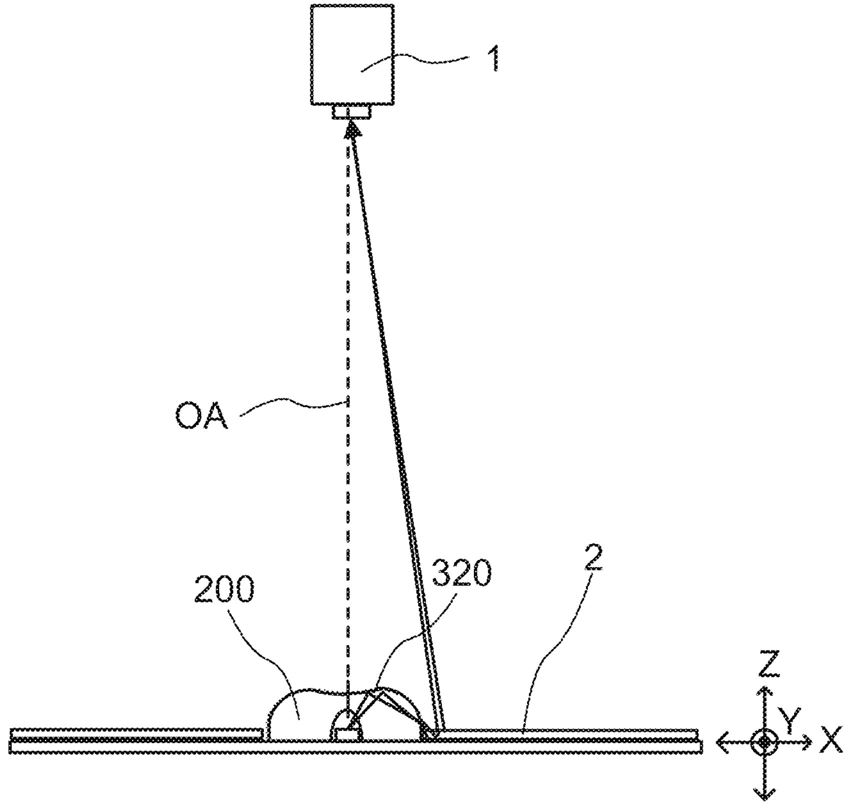
FIG. 21 is a diagram for describing a measurement method.

More specifically, as illustrated in FIG. 21, luminance meter 1 was positioned such that the detection section center coincides with optical axis OA at approximately 20 cm above the XY plane, and the light reflected by total reflection surface 320 and scattered by 0.2 mm thick reflection surface 2 (reflection sheet 2) disposed on the XY plane was measured. Light-emitting device 200 was disposed at a hole provided in reflection sheet 2. The hole of the reflection sheet has a circular shape with a diameter of 6.5 mm. The light-emitting device was disposed such that optical axis OA coincides with at the center of the circle. Only one light-emitting device 200 was turned on. Measurement was conducted under a condition with no light diffusion plate. Light emitted from the light-emitting element and directly emitted from the emission surface was not measured.

As is clear from FIG. 20A, Embodiments 1 to 4 did not satisfy Condition 3-1 but satisfied Condition 3-2. Note that, in Embodiments 1 to 4 and Comparative Examples 1 and 2, distance D was 2.36 mm as illustrated in FIG. 20A. In addition, as is clear from FIG. 20A, Embodiment 1 exhibited a shoulder peak. As is clear from FIG. 20B, Embodiments 5, 7 and 8 satisfied Condition 3-1. In addition, Embodiment 6 did not satisfy Condition 3-1 but satisfied Condition 3-2. Note that, in Embodiments 5 to 8, distance D was 2.60 mm as illustrated in FIG. 20B. Here, the term "shoulder peak" refers to a portion of the graph where the slope becomes gentle on the side where the peak extends away from reference line L1 such that second division segment W2 is larger than first division segment W1.

Note that the high peak around a Y-direction distance of approximately 0.5 mm, as illustrated in FIGS. 20A and 20B, is an error value and is neither a top peak nor a shoulder peak.

Table 2 shows the OD robustness of the surface light source devices of Embodiments 1 to 8 and Comparative Examples 1 and 2. Note that, the OD robustness was simulated in the following manner. The luminance distribution on light diffusion plate was measured in the state where one light-emitting device 1 is turned on. On the assumption of an arrangement in accordance with the pitch of the light-emitting devices using data on one light-emitting device, a state where a plurality of light-emitting devices is turned is assumed by adding the luminance of overlapping portions in the luminance distribution. The point immediately above the light-emitting element where light-emitting element OA and the light diffusion plate top surface overlap is defined as immediately above point a. The point obtained by moving in the Y direction from immediately above point a by half the center-to-center distance of adjacent light-emitting elements in the Y direction is defined as Y direction intermediate point b. The point obtained by moving in the X direction from immediately above point a by half the center-to-center distance of adjacent light-emitting elements in the X direction is defined as X direction intermediate point c. The point advanced from immediately above point a in the X direction by half the center-to-center distance of adjacent light-emitting elements in the X direction is set as a relaying point, and the point further advanced from the relaying point by half the center-to-center distance of adjacent light-emitting elements in the Y direction in the Y direction is set as intermediate point d. The luminance values at points a to d were extracted. The luminance value of each point was divided by the luminance value of immediately above point a to calculate the relative luminance value of each position. Note that, Px was set to 14 mm and Py was set to 35 mm. OD was set to 5 mm, 6 mm, 7 mm, 8 mm, 9 mm and 10 mm. The relative luminance value at each point with each OD was calculated. The largest value of the maximum difference in relative luminance with OD values at each point was defined as the OD robustness value. The OD robustness was evaluated in four grades: A to D, with A being the best and D being the worst. The passing criterion was set at grade C or higher.

TABLE 2

| Light Flux Controlling Member | OD Robustness (%) | Evaluation |
|---|---|---|
| Embodiment 1 | 3.3 | C |
| Embodiment 2 | 2.4 | B |
| Embodiment 3 | 2.5 | B |
| Embodiment 4 | 2.4 | B |
| Embodiment 5 | 2.0 | B |
| Embodiment 6 | 1.7 | A |
| Embodiment 7 | 2.3 | B |
| Embodiment 8 | 1.5 | A |
| Comparative Example 1 | 5.4 | D |
| Comparative Example 2 | 4.7 | D |

As shown in Table 2, Embodiments 1 to 8, which satisfy Conditions 1, 2, and either Condition 3-1 or Condition 3-2, all received an OD robustness evaluation of C or higher, whereas Comparative Examples 1 and 2, which did not satisfy these conditions, received a rating of D. For circular optical control members, it is expected that the OD robustness can be improved by forming the total reflection surface with 360-degree rotational symmetry to satisfy either Condition 3-1 or Condition 3-2.

INDUSTRIAL APPLICABILITY

The surface light source device of the present invention is applicable to a backlight of liquid crystal display devices, generally-used illumination devices and the like, for example.

REFERENCE SIGNS LIST

1 Luminance meter
2 Reflection surface (Reflection sheet)
10, 100 Surface light source device
11*a*, 120*a* Light arrival plane
100' Display device
102 Display member
110 Housing
112 Bottom plate
114 Top plate
11, 120 Light diffusion plate
20, 200 Light-emitting device
210 Substrate
220 Light-emitting element
300, 400, 500, 600, 700, 800, 900, 1000, 1100, 1200, 1300 Light flux controlling member
310, 410, 610, 910, 1210 Incidence surface
320, 420, 520, 620, 720, 820, 920, 1020, 1120, 1320 Total reflection surface
330, 430, 530, 630, 730, 830, 930, 1030, 1130, 1230, 1330 Emission surface
431, 531, 631, 731, 831, 931, 1031, 1131, 1231, 1331 First emission surface
432, 832, 1032, 1132, 1232 Second emission surface
440 Rear surface
521 First reflection surface
522 Second reflection surface
611 First incidence surface
612 Second incidence surface
621, 721, 921 Connection surface

The invention claimed is:

1. A surface light source device comprising:

a plurality of light-emitting devices disposed on an XY plane of an XYZ coordinate that defines an X direction, a Y direction and a Z direction orthogonal to each other; and a light diffusion plate disposed at a distance from the XY plane in the Z direction, wherein each of the plurality of light-emitting devices includes a light-emitting element and a light flux controlling member configured to control light from the light-emitting element, wherein the light flux controlling member includes an incidence surface from which light from the light-emitting element enters, a total reflection surface configured to reflect a part of light entered from the incidence surface, and an emission surface disposed at a periphery of the total reflection surface, wherein the light flux controlling member has an ellipse shape with a major axis in the Y direction and a minor axis in the X direction in plan view and bottom view of the light flux controlling member, wherein the incidence surface is an inner surface of a recess disposed on a rear side of the light flux controlling member, and the incidence surface has an ellipse shape with a minor axis in the Y direction and a major axis in the X direction in bottom view of the light flux controlling member, wherein the emission surface includes a curved surface that slopes downward in the Z direction toward an outer periphery of the light flux controlling member, wherein one or more of the plurality of light-emitting devices are arranged in a line in the X direction and one or more of the plurality of light-emitting devices are arranged in a line in the Y direction, and Py>Px holds, where Px represents a center-to-center distance of adjacent light-emitting devices among the one or more of the plurality of light-emitting devices arranged in the X direction, and Py represents a center-to-center distance of adjacent light-emitting devices among the one or more of the plurality of light-emitting devices arranged in the Y direction, wherein when a line extending along an optical axis OA of a light-emitting element of a given light-emitting device among the plurality of light-emitting devices is set as a reference line L1, an intersection of the reference line L1 and a light arrival plane located on the light-emitting device side of the light diffusion plate is set as a first reference point P1, and an angle of light emitted from the light-emitting element along the reference line L1 is set as 0°, a position where a light beam corresponding to a maximum luminous intensity peak in a graph illustrating light distribution characteristics on a YZ cross section for light emitted at emission angles between 0° and 90° from the light-emitting element, the maximum luminous intensity peak being determined from luminous intensity values measured for the light emitted at emission angles between 0° and 90°, reaches on the light arrival plane is within a range from Py/3 to Py from the first reference point P1, the range being measured along the light arrival plane from the first reference point P1 to the position, wherein light that is emitted from the given light-emitting element, reflected by the total reflection surface, and reached the emission surface is emitted from the emission surface at an angle larger than 90° with respect to the reference line L1, wherein when an intersection of the reference line L1 and the XY plane is set as a second reference point P2, and a rectangle with a side of a length Px along the X direction and a side of a length Py along the Y direction on the XY plane with the second reference point P2 as a vertex is divided by a diagonal line of the rectangle passing through the second reference point P2 into a triangular region A with the second reference point P2 located at an endpoint of the side with the length Px and a triangular region B with the second reference point P2 located at an endpoint of the side with the length Py, a greater amount of light reaches the triangular region B than the triangular region A when an arrival amount of light defined as a number of light rays reaching the light arrival plane after reflection by the total reflection surface is compared between the triangular region A and the triangular region B, wherein in a graph representing a luminance distribution of luminance variation on a straight line extending along the Y direction and passing through the second reference point P2 for light reflected by the total reflection surface and reaching the XY plane, (A) a position in the Y direction of a luminance peak top is located at a position farther from the second reference point than a distance D between an outer edge of the light flux controlling member and a center of the light flux controlling member along the Y direction, or (B) when a line segment corresponding to a half width of a luminance peak is divided into a first division segment W1 nearer to the reference line L1 than the peak top in the Y direction and a second division segment W2 farther from the reference line L1 than the peak top in the Y direction, a length of the second division segment W2 is 1.5 times or greater than a length of the first division segment W1.

2. The surface light source device according to claim 1, wherein a shoulder peak is present in the graph of the luminance distribution.

3. A display device comprising the surface light source device according to claim 1.

4. A light flux controlling member used for the surface light source device according to claim 1.

5. The surface light source device according to claim 1, wherein the total reflection surface is an inner surface of a recess disposed on a front side of the light flux controlling member, and the total reflection surface is a curved surface that is lowest in the Z direction at a central portion of the light flux controlling member and gradually increases in height in the Z direction as it moves away from the central portion in the Y direction.

* * * * *